United States Patent
Wise et al.

(10) Patent No.: US 12,506,317 B2
(45) Date of Patent: Dec. 23, 2025

(54) NONLINEAR ULTRAFAST FIBER AMPLIFIERS

(71) Applicant: Cornell University, Ithaca, NY (US)

(72) Inventors: Frank Wise, Ithaca, NY (US); Pavel Sidorenko, Ithaca, NY (US); Walter Fu, Ithaca, NY (US)

(73) Assignee: Cornell University, Ithaca, NY (US)

( * ) Notice: Subject to any disclaimer, the term of this patent is extended or adjusted under 35 U.S.C. 154(b) by 976 days.

(21) Appl. No.: 17/597,501

(22) PCT Filed: Jul. 9, 2020

(86) PCT No.: PCT/US2020/041468
§ 371 (c)(1),
(2) Date: Jan. 7, 2022

(87) PCT Pub. No.: WO2021/007461
PCT Pub. Date: Jan. 14, 2021

(65) Prior Publication Data
US 2022/0278498 A1 Sep. 1, 2022

Related U.S. Application Data

(60) Provisional application No. 62/872,178, filed on Jul. 9, 2019.

(51) Int. Cl.
*H01S 3/00* (2006.01)
*H01S 3/067* (2006.01)
*H01S 3/16* (2006.01)

(52) U.S. Cl.
CPC ...... *H01S 3/06725* (2013.01); *H01S 3/06716* (2013.01); *H01S 3/1618* (2013.01); *H01S 2301/08* (2013.01)

(58) Field of Classification Search
CPC ............ H01S 3/06725; H01S 3/06716; H01S 3/1618; H01S 2301/08
See application file for complete search history.

(56) References Cited

U.S. PATENT DOCUMENTS

2018/0109078 A1 4/2018 Bernier et al.
2020/0343681 A1* 10/2020 Pérez Millán ........ H01S 3/1618

FOREIGN PATENT DOCUMENTS

EP 2875392 B1 * 2/2019 ............ G02F 1/365
WO WO 2013120113 A1 * 8/2013 ............ H01S 3/1118

OTHER PUBLICATIONS

Sidorenko et al., Nonlinear ultrafast fiber amplifiers beyond the gain-narrowing limit, Oct. 2019, Optica, vol. 6. No. 10 (Year: 2019).*

(Continued)

*Primary Examiner* — Mark Hellner
(74) *Attorney, Agent, or Firm* — COZEN O'CONNOR

(57) ABSTRACT

Disclosed is a pulsed laser apparatus and method of generating a laser pulse. The apparatus includes an input coupler configured to receive pumping light from a pumping light source and a seed pulse from a seed pulse generator. The apparatus further includes a doped fiber-optic cable with an input port at a first end configured to receive the pumping light and the seed pulse. The doped fiber-optic cable amplifies the seed pulse to generate an output pulse. Along a first length of the doped fiber optic cable, the pulse spectrum broadens rapidly owing to nonlinearity. Beyond the first length in an extended portion, the output pulse shifts towards longer wavelengths and broadens in both spectral and temporal domains. The apparatus also includes an output port at a second end of the doped fiber-optic cable, wherein the output pulse exits the doped fiber-optic cable at the output port.

20 Claims, 23 Drawing Sheets

(56) References Cited

OTHER PUBLICATIONS

International Search Report and Written Opinion for PCT/2020/41468, dated Sep. 21, 2020, 9 pages.

Sidorenko, P., et al., "Nonlinear ultrafast fiber amplifiers beyond the gain-narrowing limit." arXiv:1906.04141v1 [physics.optics], available Jun. 2019 (Jun. 2019), Results Section, para 1; Discussion section, para [0002], 23 pages.

Sidorenko, P., Fu, W., and Wise, F. W. "Gain-managed nonlinear fiber amplifier." 2019 Conference on Lasers and Electro-Optics Europe & European Quantum Electronics Conference (CLEO/Europe-EQEC) Jun. 23-27, 2019 (Jun. 27, 2019), 1 page.

* cited by examiner

NONLINEAR ULTRAFAST FIBER AMPLIFIERS

This patent document claims priority to and benefits of U.S. Provisional Appl. No. 62/872,178, entitled "NONLINEAR ULTRAFAST FIBER AMPLIFIERS" and filed on Jul. 9, 2019. The entire content of the before-mentioned patent application is incorporated by reference as part of the disclosure of this document.

STATEMENT REGARDING FEDERALLY SPONSORED RESEARCH

This invention was made with government support under EB002019 awarded by the National Institutes of Health. The government has certain rights in the invention.

TECHNICAL FIELD

The technology disclosed in this patent document relates to optical fiber amplifiers for amplifying laser pulses and related applications in pulsed lasers and systems.

BACKGROUND

High-peak-intensity ultrafast fiber lasers can be used in various applications in industry, defense, medicine and other scientific endeavors. Fiber lasers possess many advantages over their solid-state counterparts including compactness, good thermo-optical properties, and excellent beam quality. New techniques are needed to improve the performance of fiber lasers.

SUMMARY

The technology disclosed in this patent document can be implemented to provide a new fiber-optic amplification apparatus that uses a dynamically-evolving gain spectrum as a degree of freedom in a way that the pulse and the gain spectrum actively reshape one another by using a fiber gain media that is longer than conventionally used to achieve amplification with gain-managed nonlinearity (GMN). The dynamic co-evolution of the field and gain support pulses that can broaden spectrally well beyond the gain bandwidth, while remaining cleanly-compressible to their transform limit.

In one aspect, the disclosed technology can be implemented to construct a pulsed laser apparatus. The apparatus includes an input coupler configured to receive pumping light from a pumping light source and a seed pulse from a seed pulse generator. The apparatus further includes a doped fiber-optic cable with an input port at a first end of the doped fiber-optic cable coupled to the input coupler and configured to receive the pumping light and the seed pulse. The doped fiber-optic cable amplifies the seed pulse to generate an output pulse, wherein along a first length of the doped fiber-optic cable the pulse spectrum broadens due to nonlinearity. In an extended portion of the doped fiber-optic cable beyond the first length the output pulse shifts towards longer wavelengths and broadens in both spectral and temporal domains, and wherein the doped fiber-optic cable exhibits normal dispersion and includes an output port at a second end of the doped fiber-optic cable to export the output pulse.

In another aspect, the disclosed technology can be implemented to provide a method which includes receiving pumping light, at an input coupler, from a pumping light source, and receiving a seed pulse, at the input coupler, from a seed pulse generator. The method includes amplifying, along a first length of a doped fiber-optic cable coupled to the input coupler and configured to receive the pumping light and the seed pulse, the seed pulse to generate an output pulse. Along a first length of the doped fiber-optic cable the pulse spectrum broadens due to nonlinearity, wherein in an extended portion of the doped fiber-optic cable beyond a first length the output pulse shifts towards longer wavelengths and broadens in both spectral and temporal domains. The doped fiber-optic cable exhibits normal dispersion and includes an output port at a second end of the doped fiber-optic cable to export the output pulse.

Those and other aspects and implementations of the disclosed technology are described in greater detail in the drawings, the description and the claims.

BRIEF DESCRIPTION OF THE DRAWINGS

FIG. 3A depicts an example of longitudinal evolution of the gain. FIG. 3B depicts an example of peak power and pulse energy vs. propagation distance. FIG. 3C depicts an example of bandwidth and chirped duration of the pulse vs. propagation distance.

FIG. 4A depicts an example of a chirped output pulse. FIG. 4B depicts an example of a compressed pulse and transform-limited pulse.

FIG. 5A depicts examples of different seed pulses and their corresponding spectrograms. FIG. 5B depicts an example of the evolution of the peak power for each seed. FIG. 5C depicts examples of amplified pulses produced with the different seeds, taken at the same power level (indicated by the dashed black line in FIG. 5B.

FIG. 6A depicts examples of measured and simulated output spectra for increasing pump power (labeled with the output energies). FIG. 6B depicts examples of compressed 107-nJ pulse and transform-limited pulse.

FIG. 7A depicts an example of output spectra of a GMN amplifier; and FIG. 7B depicts examples of corresponding compressed pulses for a constant seed spectrum (black dashed curve in A), with the indicated seed pulse energies. FIG. 7C depicts examples of output spectra and pulse shapes of a GMN amplifier seeded with constant seed energies, and FIG. 7D depicts examples of corresponding dechirped pulses.

FIG. 8A depicts examples of measured (solid blue curve) and simulated spectra for increasing pump powers. FIG. 8B depicts examples of measured and simulated pulse shapes that correspond to the result in FIG. 8A. FIG. 8C depicts examples of measured compressed pulse and calculated transform-limited pulse.

FIG. 9A depicts an example compression of experimental results with simulations where 1 photon per frequency band shat-noise was added to the seed pulse. FIG. 9B depicts an example of compression with simulations where 1000 photons per frequency band shot-noise were added to seed pulse. Solid curves show experimental results and dashed curves show results from numerical simulations.

FIGS. 11A-11F show an example of spectral evolution of the amplified pulse and saturated gain spectrum. FIGS. 11G-11L show an example of temporal evolution of an amplified pulse.

FIG. 12A depicts an example of longitudinal evolution of the gain. FIG. 12B depicts an example of peak power and pulse energy vs. propagation distance. FIG. 12C depicts an example of bandwidth and duration of the pulse vs. propagation distance.

FIG. 14A depicts a schematic of the laser cavity. FIG. 14B depicts experimentally measured and simulated spectra for a range of pulse energies. FIG. 14C depicts spectral evolution of the pulse in the cavity for 190-nJ output pulses.

FIG. 15A depicts an example of spectral pulse evolution. FIG. 15B depicts an example of peak power and pulse energy vs. propagation distance. FIG. 15C depicts an example of bandwidth and chirped duration vs. propagation distance.

DETAILED DESCRIPTION

Figure 1A:
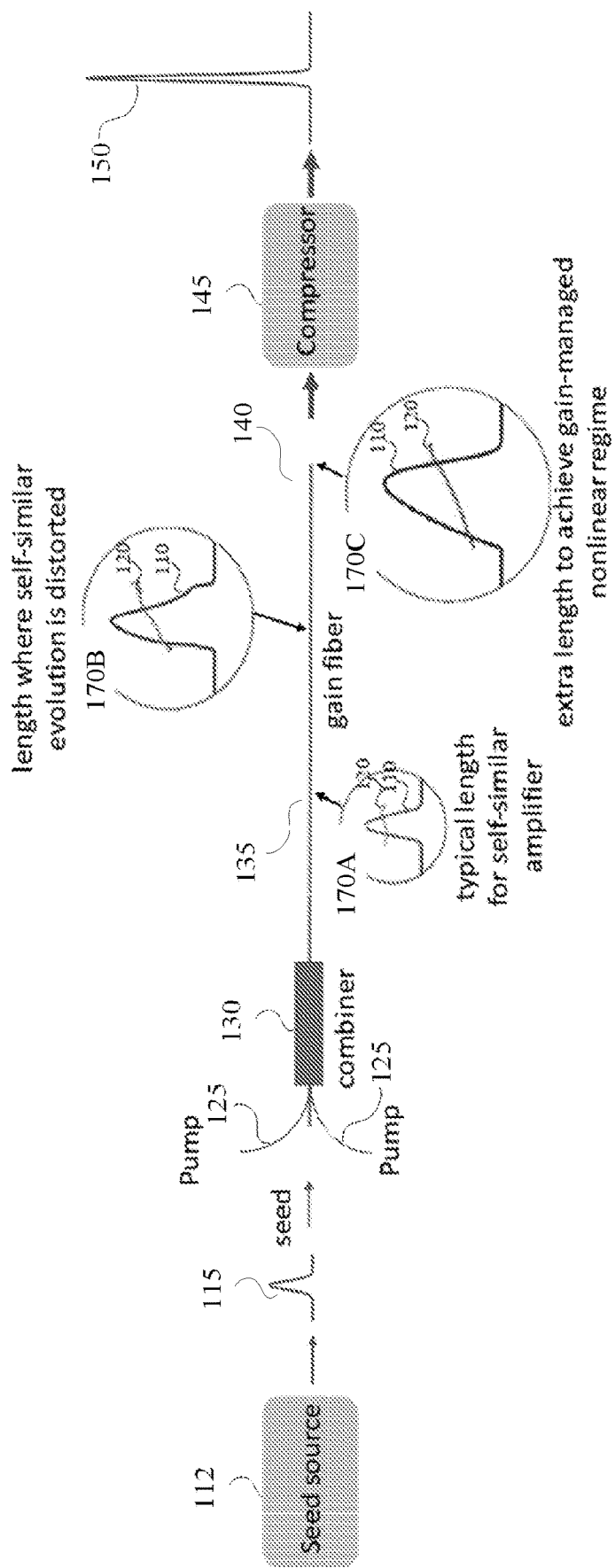
FIGS. 1A-1C depict an example of a doped fiber amplifier system and simulated pulse evolutions under the amplification regime with gain-managed nonlinearity (GMN).

Ultrafast lasers can be used in a wide range of applications in science and industry. Fiber-based ultrafast laser sources in certain designs can be especially attractive because of their compactness, alignment-free setups, and potentially low costs. Confining short pulses within a fiber core leads to high intensities, which can drive a host of nonlinear effects. While these phenomena and their interactions greatly complicate the design of such systems, they can also provide opportunities for engineering new capabilities. The technology disclosed in this patent document can be used to provide a new fiber amplification device that uses a dynamically-evolving gain spectrum as a degree of freedom: as a pulse experiences nonlinear spectral broadening, absorption and amplification actively reshape both the pulse and the gain spectrum. The dynamic co-evolution of the field and excited-state populations support pulses that can broaden spectrally by, for example, about two orders of magnitude in some implementations and well beyond the gain bandwidth, while remaining cleanly-compressible to their transform limit such as sub-50-fs in some implementations. In some example embodiments, a nonlinear attractor underlies the management of the nonlinearity by the gain.

High-peak-intensity ultrafast fiber lasers possess many advantages over their solid-state counterparts including compactness, good thermo-optical properties, and excellent beam quality. On the other hand, the confinement of high-peak-power pulses in a small core for long propagation distances results in the accumulation of large nonlinear effects, which degrade the pulse quality. High-energy sources may be based on chirped-pulse amplification (CPA), in which the pulse from an oscillator is stretched, amplified, and subsequently compressed. Stretching reduces the peak intensity, and in turn, the strength of nonlinear effects such as self-phase modulation (SPM) and stimulated Raman scattering (SRS). In a typical fiber CPA system, the pulse duration is limited to ~200 fs by gain narrowing and residual dispersion mismatch between the stretcher and compressor. Although the dispersion mismatch can be mitigated to some degree by SPM-induced nonlinear phase, gain narrowing remains a challenge. While 200-fs pulses are suitable for some applications, others, such as high harmonic generation, benefit from shorter pulse durations. Shorter pulses can be obtained by a subsequent stage of nonlinear pulse compression, which increases the complexity of the system and decreases the overall efficiency. In contrast to CPA, there exist techniques based on nonlinear pulse propagation that can be used to achieve sub-100-fs pulse durations. These include direct amplification and pre-chirp management as well as amplifiers designed to support self-similar pulse evolution. While such approaches can yield sub-100-fs pulses, they suffer from their own set of limitations. Similariton amplifiers benefit from a nonlinear attractor that is indifferent to many of the seed characteristics, but at higher energies their spectra overflow the gain bandwidth, degrading the compressed pulse quality. Nonlinear amplifiers using pre-chirp management can extend this limit and reach energies as high as the microjoule level and durations as short as 24 fs; however, achieving optimal performance often requires a carefully-chosen seed pulse, which hampers energy scaling and increases the complexity of the design.

Disclosed herein are fiber amplifiers in a new regime of fiber amplification that addresses at least two challenges of ultrafast fiber lasers: 1) management of the high nonlinear phase shifts encountered in stretcher-less amplification systems, and 2) generation of bandwidths much broader than the gain spectrum that can be compressed to clean, sub-100-fs pulses. In this regime, the pulse spectrum and the gain spectrum evolve and reshape one other in tandem in a way that can be referred to as amplification with gain-managed nonlinearity (GMN) by using a fiber gain medium with an extra length beyond the maximum conventional length of the fiber gain medium in various existing fiber amplifier designs while producing amplified laser pulses with desired pulse quality with post-amplification pulse compression. In the fiber amplifying section along the optical path, the gain/population inversion is spatially varying. The variation along the longitudinal direction of the fiber is dynamic, occurring as the pulse propagates. The intentional use of co-evolving gain to control pulse evolution is rare. In contrast to where doping is used in amplifiers as a degree of freedom to reduce the nonlinearity and heat load, the disclosed gain-managed nonlinearity (GMN) is based on the use of an evolution of the gain spectrum to take advantage of nonlinear effects in the extra length of the fiber gain medium. In this GMN regime, an accumulation of nonlinear phase (e.g., on the order of ~200π, which corresponds to 70-fold spectral broadening) can be accommodated while still generating clean compressed pulses. The GMN regime has been demonstrated using the disclosed subject matter in ytterbium-doped fiber to obtain broadband amplified pulses that can be compressed to ~40 fs durations. The pulse evolution in the gain medium may be driven by a nonlinear attractor, which may simplify device design.

Figure 1B:
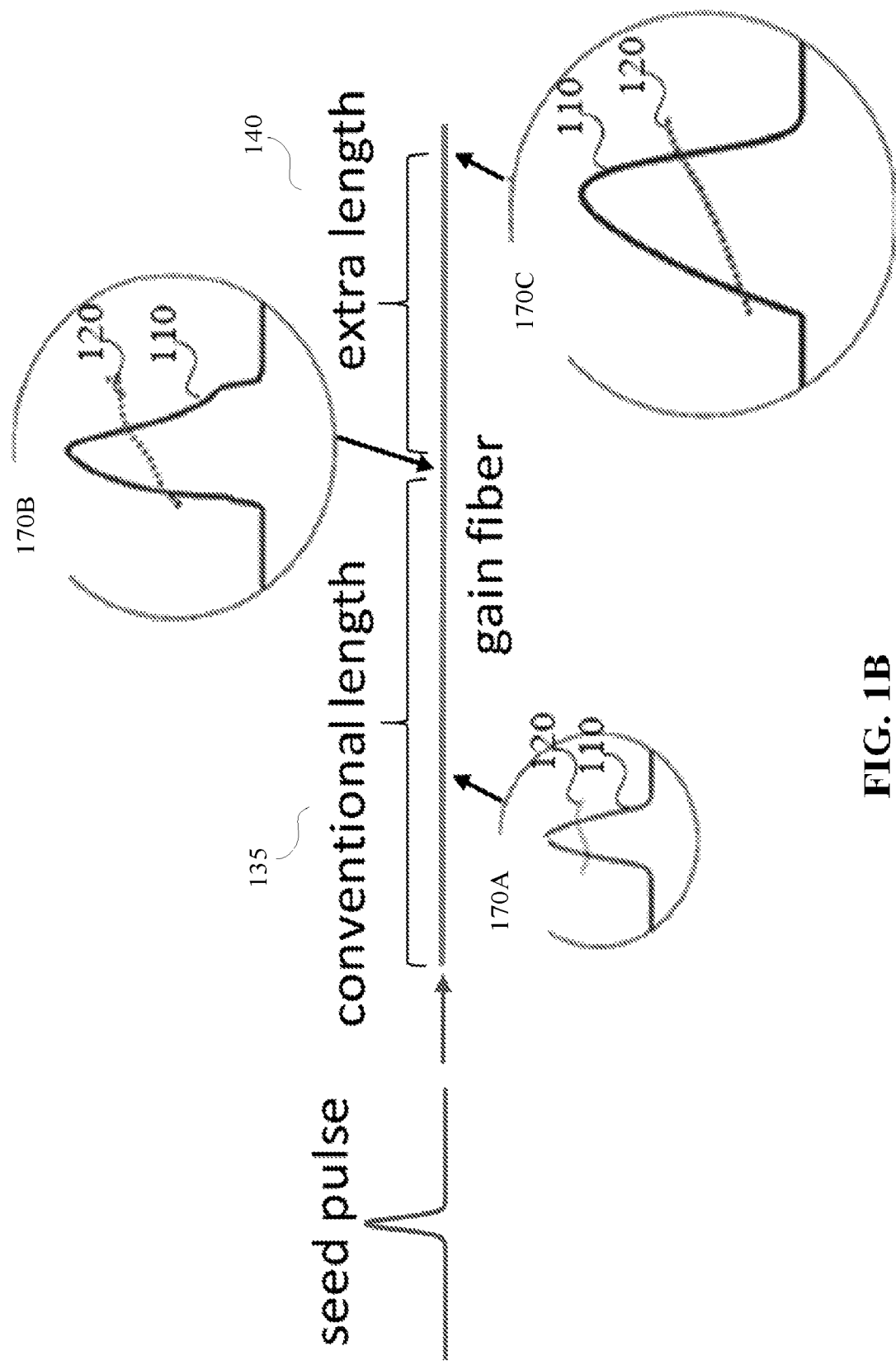
Figure 1C:
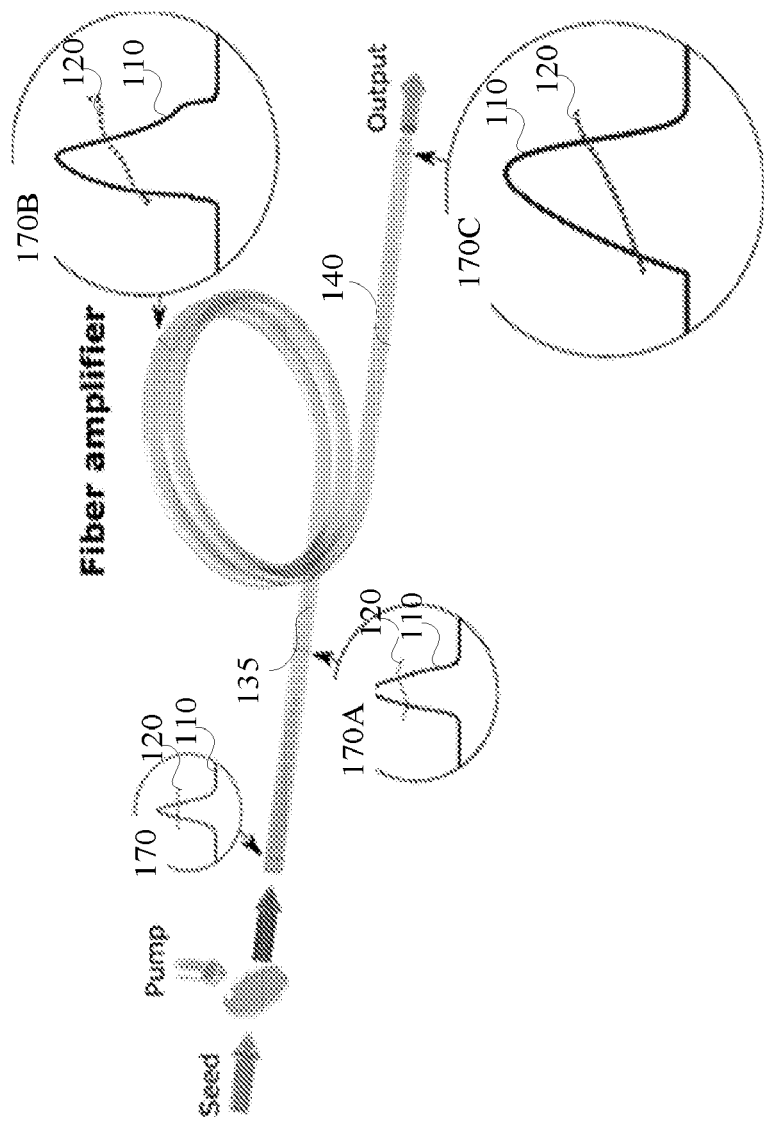

FIGS. 1A, 1B, and 1C depict examples of doped ytterbium fiber amplifier systems and examples of simulated pulse evolutions under the gain-managed nonlinearity (GMN) regime.

FIG. 1A depicts an example of a pulsed fiber amplification system 100 for amplifying a seed pulse to generate a larger compressed output pulse. Seed source 112 generates an optical seed pulse 115 that is combined with optical pumping light 125 in the fiber gain medium to cause pulse amplification. In FIG. 1A, two pumping inputs are shown but one pumping input may be used as well. The pumping light 125 and seed pulse 115 are optically combined by combiner 130. The combined light is input into a doped gain fiber of a predetermined length. Normally, the length of the gain fiber is limited by distortions of the pulse that increase with length which is further described below. In a conventionally-designed amplifier both the temporal duration and the spectral bandwidth of a pulse increase exponentially with distance in the amplifier. As soon as either of those deviates from exponential, the maximum length has been reached. Usually, an amplifier for amplifying short pulses is designed to produce a parabolic intensity profile, with a linear frequency sweep. The pulse in 170A is evolving toward that combination. The conventional maximum length is the length where distortions of the output pulse intensity the profile from a parabola (110 in 170B) and instantaneous frequency from a line (120 in 170B) begin to be appreciable. In practice, this is manifested as a reduction in pulse quality after compressing the pulse. Once that is observed, an expert knows the fiber is too long for given fiber parameters such as the absorption of the pump light and the ratio of the core to cladding diameter. The disclosed amplifier is longer than the conventional limit by the extra length 140 by design to intentionally use the additional nonlinear effects in the extra length 140 to further broaden the spectral span and temporal span of the pulsed light and to further amplify the amplitude of the pulsed light to achieve amplification with gain-managed nonlinearity (GMN). After the pulse passes through conventional length 135 plus extra length 140, the pulse enters compressor 145 which then produces compressed pulse 150.

The GMN amplification regime can be demonstrated by an example of FIG. 1A with specific values. FIG. 1A depicts an example system and the simulated pulse evolution at 170A-170C in a highly-doped, ytterbium fiber amplifier. In this example, a 0.5-nJ, 0.8-ps Gaussian pulse at 1028 nm (shown at 115) is launched into an ytterbium (Yb)-doped fiber amplifier with a 6-μm core diameter, which is co-pumped by pump light at 976 nm (shown at 125) and combined by combiner 130. The numerical model includes second- and third-order dispersive effects, along with self-phase modulation, self-steepening, Raman scattering, and the gain calculated by solving the population inversion rate equations simultaneously with the pulse evolution. The pulse evolution initially follows the trajectory: dispersive and nonlinear effects are both prevalent, and the pulse quickly broadens into a self-similar pulse or similariton (170A). As the pulse's energy and bandwidth increase due to propagation in the Yb-doped gain fiber, gain-shaping begins to impede the similariton's growth, leading to the expected nonlinear pulse distortions and the loss of self-similar propagation as the pulse continues its path in the Yb-doped gain fiber (170B). The condition in 170B is traditionally taken to be the limit of self-similar amplification, with the result that such systems rarely reach useful energies for high-performance applications. However, if the pulse evolution is allowed to continue, a new regime emerges in the pulse in the Yb-doped gain fiber. As the inversion decays away, the pulse shifts towards longer wavelengths and continues broadening in both the spectral and temporal domains. The pulse energy increases due to the gain and the pulse evolves to an asymmetric temporal profile with a smooth spectrum (170C). Notably and surprisingly, the new pulse develops a monotonic chirp that can be compensated with a grating pair. In 170A-170C, the temporal intensity is shown at 110 and instantaneous frequency is shown at 120 which corresponds to the self-similar pulse at 170A, the pulse beyond the self-similar regime at 170B, and the GMN regime at 170C.

FIGS. 1B-1C provide additional illustrations of the fiber amplification system in FIG. 1A.

Figures 2A, 2B, 2C, 2D, 2E, 2F, 2G, 2H, 2I, 2J, 2K, 2L:
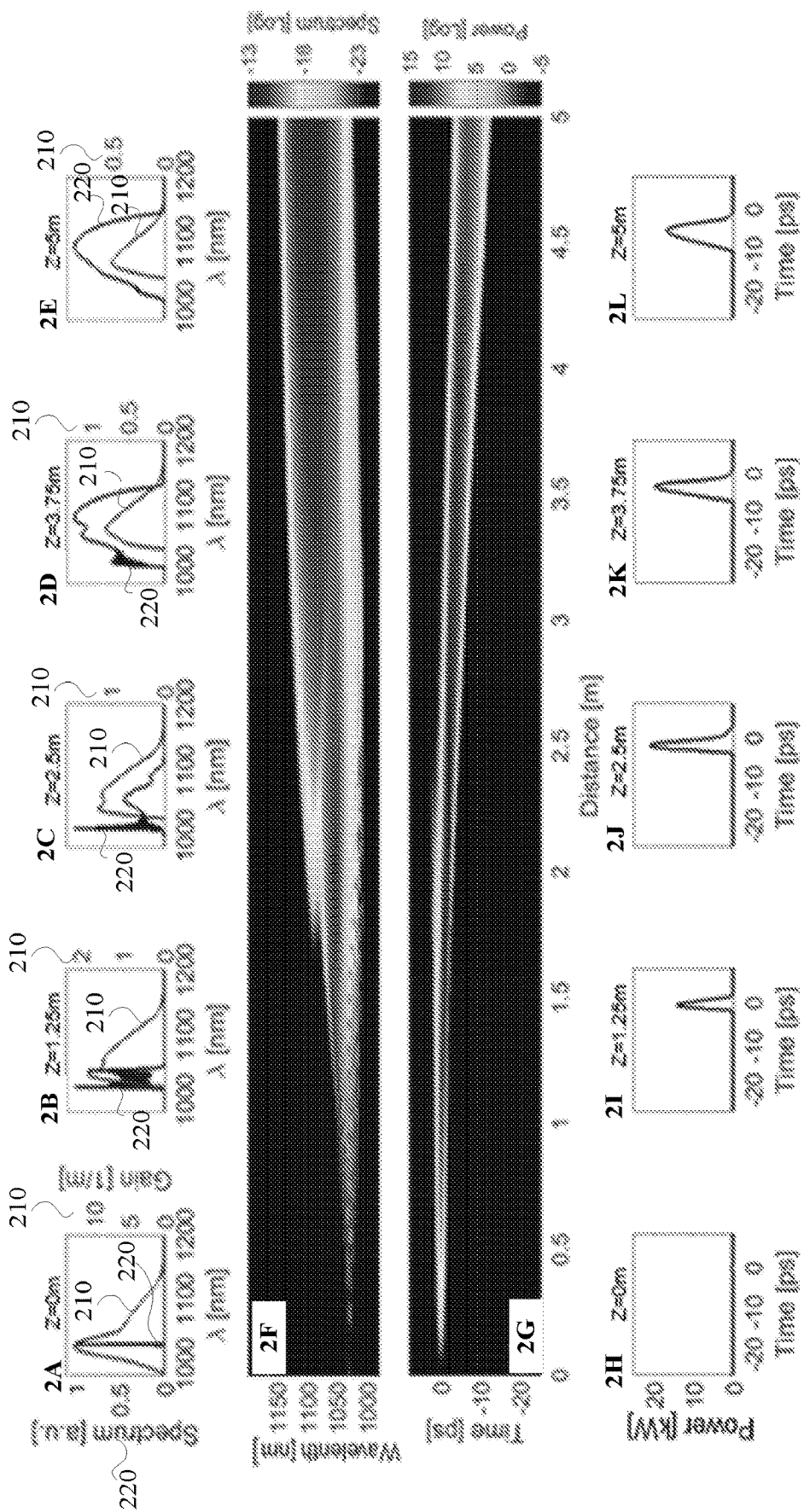
FIGS. 2A-2L depict an example of a pulse evolution in Yb-doped fiber.

FIG. 2 includes FIGS. 2A-2L and shows an example of a pulse evolution in Yb-doped fiber where the y-axis for the gain curves is on the right of each of FIGS. 2A-2E, at 210. The scale in FIGS. 2A-2E changes from one figure to another. For example, at z=1.25 m (FIG. 2B), the peak gain is about 2 per meter. At z=5 m (FIG. 2E) the peak gain is below 0.5 per meter. Therefore, the gain, which is proportional to the inversion), is decaying away along the fiber.

In some implementations, the gain fiber can be designed to be spatially uniform with approximately the same doping level along the fiber. The desired evolution is achieved by making the doping in the gain fiber sufficiently high and the fiber sufficiently long. The input pulse is launched at a wavelength shorter than usual, near the transition between the absorption and the gain.

This regime that unexpectedly emerges beyond self-similar amplification is of interest from the standpoints of both nonlinear wave physics and applications. To understand its origins, detailed, simulations were performed. Modeling the true gain calculated from the rate equations is of importance, as the quasi-three-level nature of Yb-doped fiber leads to the gain spectrum changing dynamically as different components of the pump and signal waves are absorbed and reemitted. This leads to a longitudinally-evolving gain spectrum and an intertwining of the roles of nonlinearity and gain-shaping, with the end result that the nonlinear phase is managed and a compressible frequency chirp is maintained.

In implementing the GMN amplification, the devices disclosed here use optical materials or components in the optical path that are free of anomalous dispersion and exhibit only normal group velocity dispersion. Therefore, such a device is an all-normal-dispersion device. See, U.S.

Pat. No. 8,416,817B2 to Cornell University entitled "All-normal-dispersion femtosecond fiber laser" which is incorporated by reference as part of the disclosure of this patent document. For example, a fiber material may support light which has a spectral range of wavelengths over which the dispersion is normal and another spectral range over which the dispersion is anomalous, such as the commonly used silica fiber whose dispersion is normal for wavelengths below 1300 nm and is anomalous above 1300 nm. For another example, Yb-doped silica fiber emits light in the spectral range from 1000-1200 nm in wavelength over which the dispersion is normal for all those emitted wavelengths. Thulium-doped silica fiber emits light around 1900 nm in wavelength at which ordinary fiber would have anomalous dispersion and thus would not be suitable for implementing the disclosed technology. In implementations, a fiber material can be engineered (e.g., the sizes/shapes of core and cladding and their refractive indices) to provide sufficient normal dispersion to shift the total dispersion of the material (from material and design) to the normal dispersion regime for implementing the disclosed technology.

Figures 3A, 3B, 3C:
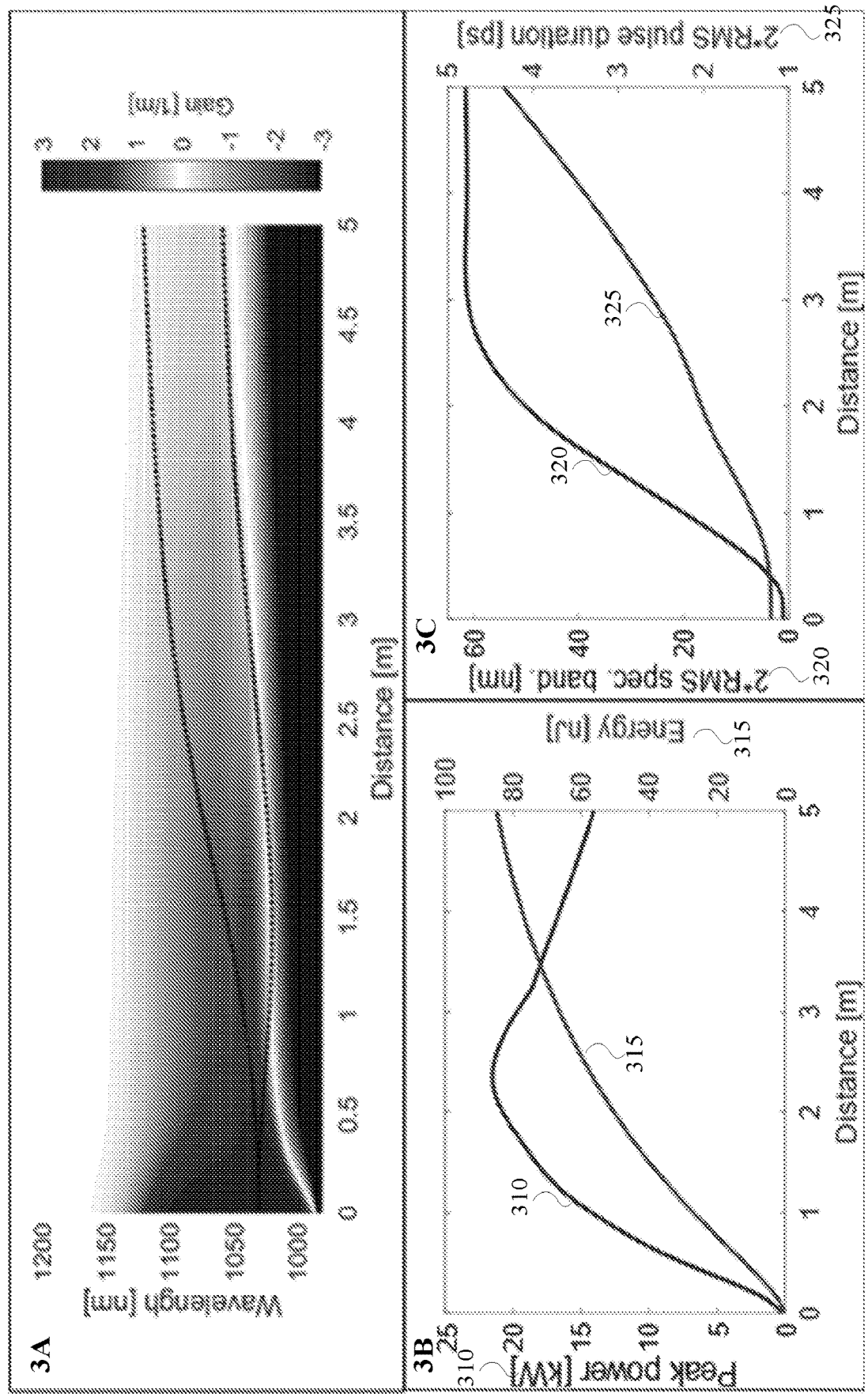
FIGS. 3A-3C depict an example of pulse and gain evolution in an optical amplifier.

Features of the GMN amplification regime are illustrated in FIGS. 2 and 3. The mutual interaction of the signal and gain can be enhanced in long, highly-doped gain fibers, and when the seed wavelength is chosen to be close to the transition between absorption and gain in the fiber. The same 1028-nm seed wavelength may be kept as before but increase the transform-limited duration to 2 ps in order to explore the use of different seed pulses. A Yb-doped fiber amplifier with a 6-µm core diameter that is co-pumped at 976 nm is used. Initially, the pulse evolution is dominated by SPM (FIGS. 2A-2B). After traveling in the Y-doped fiber for a sufficient length, for example, about 2 m, the pulse begins evolving toward a smooth, asymmetric temporal shape instead of experiencing the expected wave-breaking distortions. The longitudinal evolution of the gain spectrum is shown in FIGS. 2A-2E by the curves at 210. The GMN regime is achieved when nonlinear spectral broadening balances gain-shaping. This balance manifests as absorption of the blue part of the spectrum and amplification of the red part (FIGS. 2C-2E, and 3A). This use of both gain and loss during pulse amplification is a crucial aspect of the GMN regime, despite running counter to conventional amplifier design rules. Furthermore, unlike other amplification regimes, the peak power of the pulse does not increase monotonically with propagation through the amplifier. Instead, the peak power of the pulse reaches a maximum at around 2 m and decreases thereafter (FIGS. 2H-2L and 3B). This nonmonotonic behavior is due to the dynamic balance between gain and the effects of dispersion, as can be seen in FIGS. 3B and 3C. The pulse's spectrum gets broader due to the varying gain and this broader spectrum enhances the effects of the constant dispersion, so the pulse broadens quickly and that brings the peak power down. During the initial stage of evolution, where the pulse is evolving toward the parabolic attractor, the peak power grows due to the nearly-exponential, broadband (relative to the pulse) gain, and the pulse bandwidth increases. The effects of dispersion increase due to the nonlinearly-accruing bandwidth, while the rate of amplification decreases as more of the pump is absorbed; after ~2 m of propagation, dispersive temporal broadening overcomes the gain and causes the peak power to subsequently decrease. The pulse energy continues to increase monotonically, aided by the increasing temporal duration, while the pulse maintains its time-domain intensity profile.

Figures 4A, 4B:
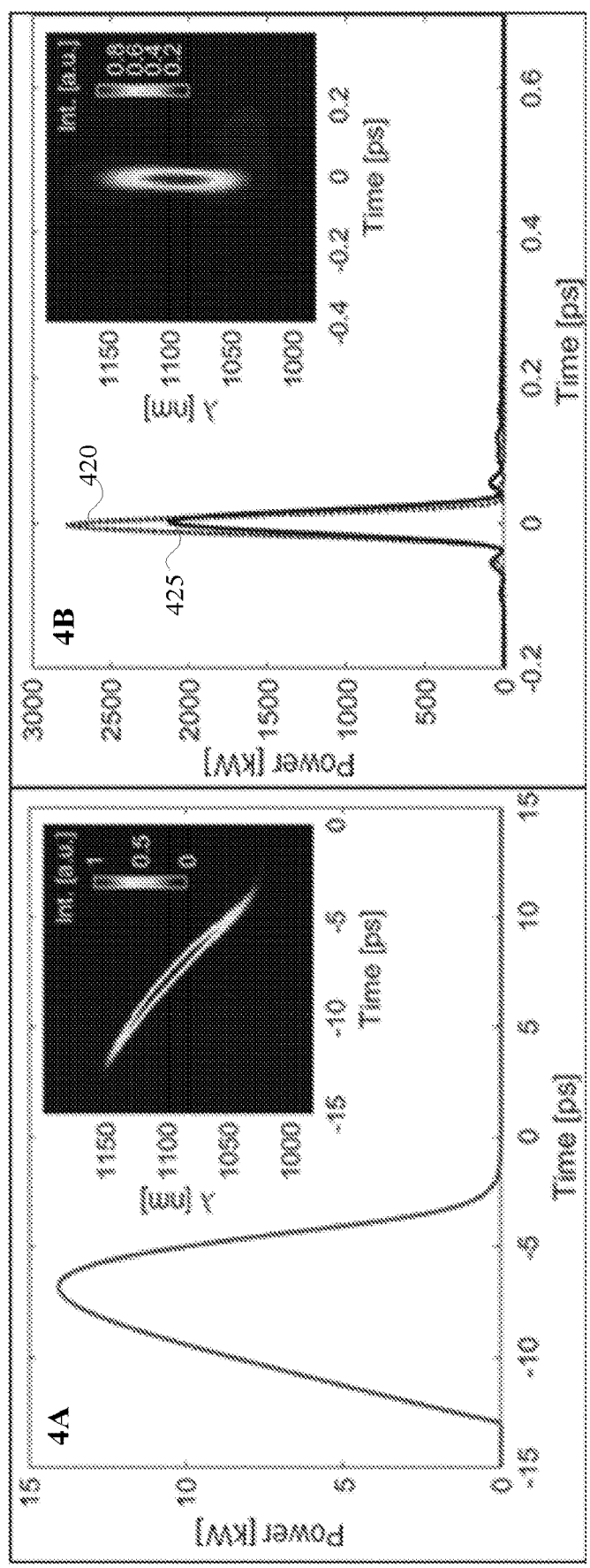
FIGS. 4A-4B depicts example of pulses generated by an amplifier with gain managed nonlinearity (GMN).

A comparison of the spectral evolution of the pulse and gain helps to understand the GMN regime. The initial spectral broadening is arrested when the blue side of the spectrum encounters the absorption near 1020 nm (FIGS. 3A-3C). This absorption feature and the gain window both shift to the red with continuing evolution, so the blue side of the pulse spectrum is limited while its red side continues to broaden unhindered. As the peak power and the net gain start to decay, the growth of the pulse spectral bandwidth saturates, hemmed in by residual absorption on the blue side and vanishing gain on the red side. This is the origin of the asymmetric, steady-state pulse that emerges at the output of the amplifier (FIGS. 2F and 4A). Surprisingly, following this complicated and dynamic mixing of spectral components, the pulse (FIG. 4A) can be easily-compressed to near the transform limit (FIG. 4B). The deviation from a linear chirp is accommodated by the design of a grating compressor. Thus, despite the nonlinear and broadband pulse evolution, a grating compressor suffices to produce a high-quality, nearly transform-limited pulse. The cleanliness of this compression despite $120\pi$ of nonlinear phase accumulation is a feature of similariton evolution; however, the pulse has developed beyond the similariton regime in terms of its propagation trajectory, its bandwidth, and its overall performance. This pulse evolution requires only the presence of group-velocity dispersion, self-phase modulation, and the true gain as calculated from the rate equations.

Figures 5A, 5B, 5C:
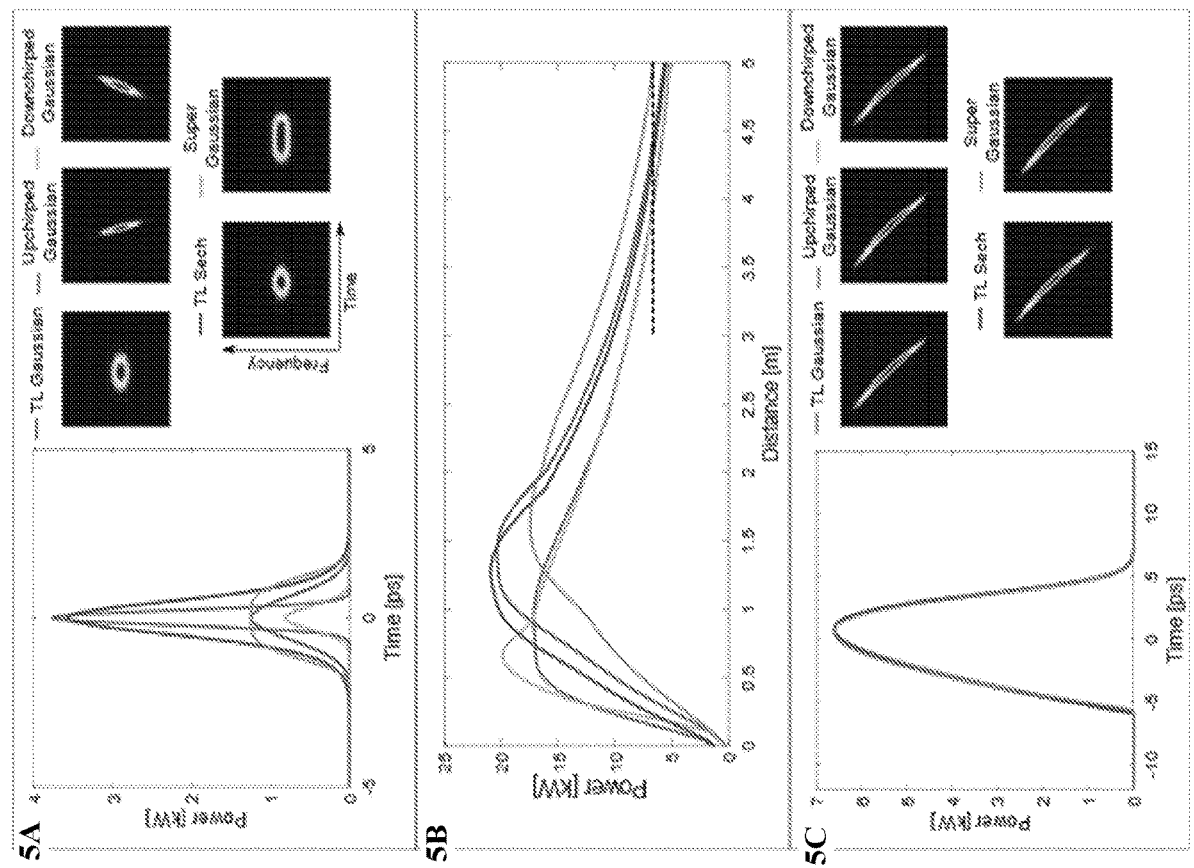
FIGS. 5A-5C depict examples of numerical evidence of the nonlinear attractor.

Simulations provide indications that the final, asymmetric pulse shape is a nonlinear attractor. That is, the pulse evolution in the GMN regime is driven more by nonlinearity and gain-shaping than by the particular parameters of the seed pulse. To demonstrate this, we simulate launching seed pulses that span a range of shapes, energies, durations, chirps, bandwidths, and peak powers (FIG. 5A) into a fixed amplifier. The different pulses evolve in a qualitatively-similar manner: each pass through an initial SPM-dominated transient before entering the GMN amplification regime. The transition between these two regimes depends on the seed pulse, and can be approximated based on the peak power, which reaches a maximum near the transition point and subsequently decreases as is characteristic of the GMN regime (FIG. 5B). In particular, although the different pulses evolve at different rates, we can compare them at equivalent points in their evolutions by noting where each crosses a peak power threshold (dashed black line in FIG. 5B). At that point, the pulses are nearly identical (FIG. 5C, showing that the amplified pulse is a nonlinear attractor.

Nonlinear attractors have a role in nonlinear dynamical systems. A nonlinear attractor in normal-dispersion amplifiers is the similariton. The rarity of nonlinear attractors in fiber systems and the similarities between the two regimes make it natural to wonder whether the similariton and GMN regimes might be related. Current understanding indicates that they are not, due to several features which fundamentally distinguish the GMN regime. It is well-known that, although similaritons can exist within various homogeneously-broadened and saturated gain models, they will distort and become incompressible in the presence of gain-shaping. In contrast, the GMN regime exists when strong gain-shaping is present, with the effects of both gain and loss included. This is exemplified by the spectrum in FIG. 2, which exceeds the gain bandwidth (curves 210 in FIGS. 2A-2E) over much of the pulse's propagation. Furthermore, a similariton is characterized by exponential growth in its energy, duration, peak power, and bandwidth. A pulse in the GMN regime grows in duration (FIG. 3C), while its energy and bandwidth saturate (FIGS. 3B-3C) and its peak power decreases (FIG. 3B). The nature of the GMN regime may reveal connections underlying these two attractors.

Figures 6A, 6B:
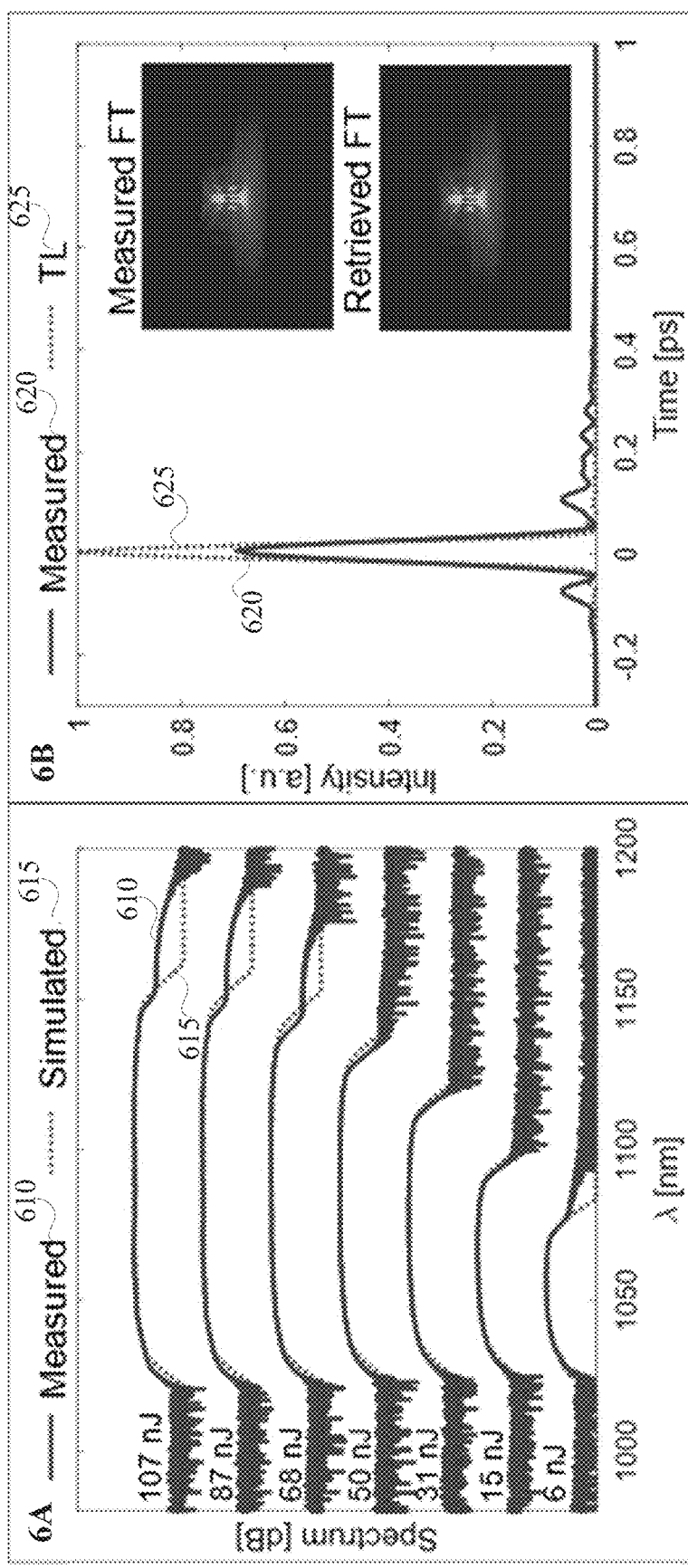
FIGS. 6A-6B depict an example of a GMN amplifier.

GMN amplification has been demonstrated in 5 meters of highly-doped Yb fiber with 5-☐m core diameter (Nufern PM-YDF-5/130-VIII), co-pumped by a 976-nm diode. The amplifier was seeded with transform-limited, 700-fs, 1-nJ pulses. With increasing pump power, the spectrum broadens substantially, in agreement with simulations (FIG. 6A). The measured bandwidth rapidly grows to extend past 1100 nm, overflowing the bandwidth of Yb-doped gain media. Using a grating compressor, the amplified pulses may be dechirped to their transform limit, indicating that the generated bandwidth is coherent rather than originating from shot-noise-seeded Raman scattering The coherence of the pulses across their full bandwidths is further confirmed using dispersive Fourier transform measurements (not shown), which show that the single-shot pulse spectra are stable and low-noise. For pulse energies of 68 nJ or higher, Raman scattering is observed, but only as a low-intensity spectral shoulder that is clearly distinguishable from the main pulse. (Quantitative discrepancies between the simulated and experimental Stokes waves are discussed in FIG. 9.) At the highest output pulse energy (107 nJ, where the Raman contribution is less than 3% of the pulse energy), the amplified pulses are compressed to 42 fs, near the transform limit.

Figures 7A, 7B, 7C, 7D:
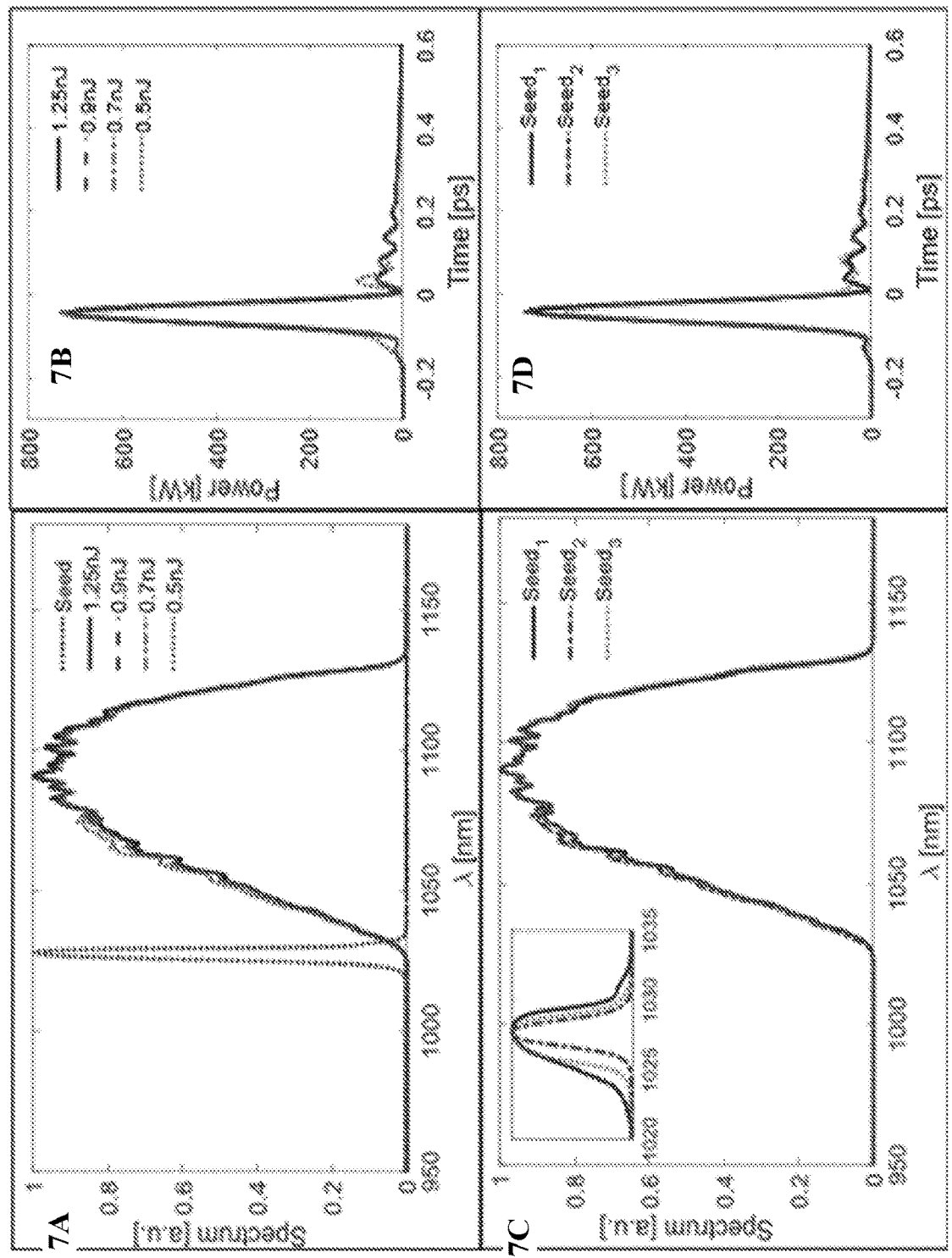
FIGS. 7A-7D depict experimental evidence of a nonlinear attractor.

To determine that the pulse evolves to a nonlinear attractor, a variety of seed pulses may be launched into an amplifier. In an example, the seed spectrum and duration are held constant while the energy is varied by nearly a factor of 3 (FIGS. 7A-7B); in another, a filter is used to vary the bandwidth of the transform-limited seed (and thereby, vary its duration) while its energy is held constant at 0.5 nJ (FIGS. 7C-7D). With either type of variation, the output spectrum (FIGS. 7A,7C) and compressed pulse (FIGS. 7B, 7D) remain largely invariant, with no adjustment of the pump power or grating compressor. This stark insensitivity of the output to the seed characteristics is a strong indication that a nonlinear attractor underlies the GMN amplification regime.

Figures 8A, 8B, 8C:
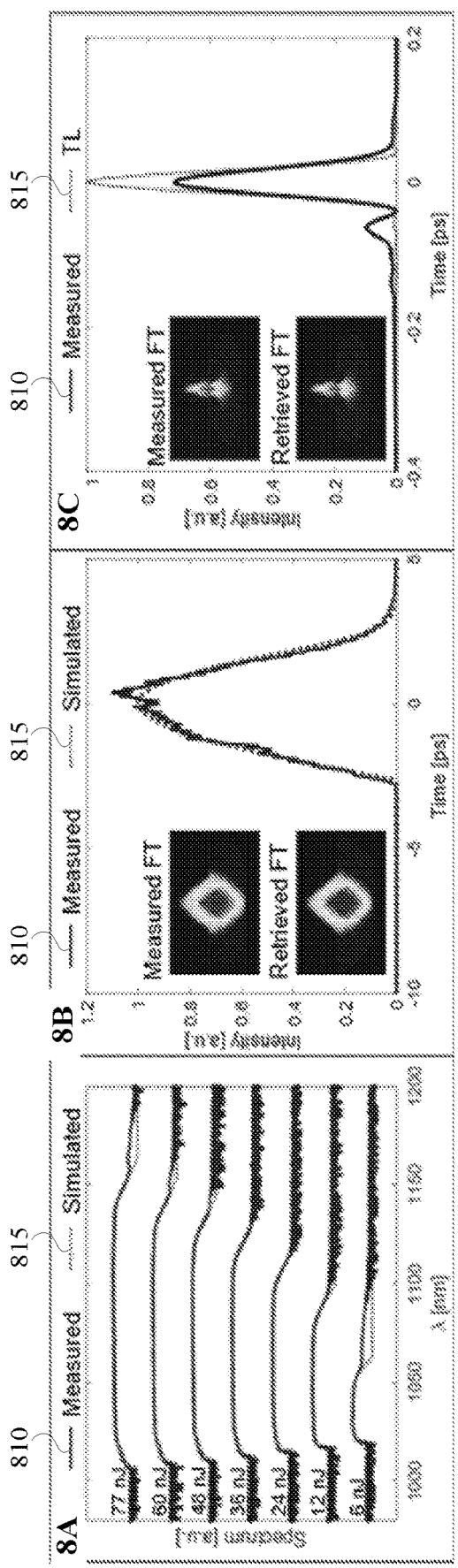
FIGS. 8A-8C depict examples of chirped pulses from a GMN amplifier.

Considering the significance of the attracting pulse shape in the GMN regime, the pulse may be measured directly from the amplifier and compared to simulations. In an example, a shorter amplifier may be constructed, seeded by narrowband transform-limited pulses with an energy of 3 nJ. This yields shorter, lower-energy, less-broadband amplified pulses that can be measured directly with FROG. Simulations of this amplifier exhibit good agreement with the measurements (FIG. 8). The pulse energy was limited to 77 nJ to limit the bandwidth. The measured output pulse exhibits the expected asymmetric temporal shape and good agreement with simulations (FIG. 8B), and can be compressed to near the transform limit (FIG. 8C).

Initial demonstrations of the GMN amplification regime have been described above. The nonlinear-wave physics has been described but it should be mentioned that the results obtained offer performance advantages over prior approaches. The generation of stable 200-nJ and 40-fs pulses (FIG. 10) was achieved with an ordinary, single-mode fiber. Simulations indicate that 300-nJ and 30-fs pulses should be possible with greater pump power. Pulse energy scaling in the GMN regime to large mode area (LMA) fibers is interesting: for double-clad LMA fibers, the rate of pump absorption will affect the longitudinal gain evolution in a non-trivial manner, which may result in scaling relations more complex than simple mode-area scaling. Short pulses are obtainable using this approach, and filtering the output yields energetic, transform-limited pulses in spectral regions outside conventional gain windows (FIG. 13).

The GMN regime is present at least in systems where a longitudinally-varying population inversion gives rise to a changing gain spectrum. While Yb-doped fiber as an exemplary case of this regime, other gain media such as Er-, Tm-, and Nd-doped fibers can also be structured to satisfy this criterion. Thus, the GMN regime should be accessible in other spectral regions, provided that normal dispersion can be obtained. An example of an Er-based GMN amplifier is shown in FIG. 11. Also interesting are systems where the gain and loss are artificially arranged. For example, fiber Bragg gratings written directly into gain fibers being used to manipulate and engineer the evolution of the gain and loss. Combinations of different gain media, such as Yb-Er co-doped gain fibers, and/or the simultaneously use of co- and counter-propagating pump fields, may also be employed to further engineer the longitudinal gain evolution.

As an example of a practical application of the nonlinear attractor, it may be possible to reduce or compensate noise or drift in a source of seed pulses. This would allow even relatively-noisy sources, such as harmonically mode-locked oscillators, to be used to seed GMN amplifiers. Numerical simulations (FIG. 12) show that the GMN regime underlies the pulse evolution in high-performance fiber oscillators.

As for performance, it is interesting to consider how GMN-based fiber amplifiers might be scaled to extremely large mode areas. Such fibers exist, but it is well-known that the existence and population of multiple transverse modes can lead to reductions in the output beam quality. Kerr beam self-cleaning is a recently-discovered technique that shows promise as a means of improving the quality of multimode beams, but relies on strong Kerr nonlinearity. The ability of the GMN regime to tolerate similarly high nonlinear phase shifts raises the intriguing possibility of combining these two techniques: GMN-based fiber amplifiers may take advantage of huge-core, highly-multimode fibers without sacrificing beam quality. Such systems could extend fiber lasers to the 100-MW level while retaining ~30-fs pulse durations, putting them for the first time in direct competition with solid-state CPA systems.

In conclusion, a new amplification regime in which nonlinear spectral broadening is balanced by strong, longitudinally-evolving gain-shaping is disclosed. In contrast with conventional ultrafast amplifiers, in which the gain is static, in the GMN regime, the evolution of the gain spectrum is a complementary and unexplored degree of freedom. The distinct characteristic of this regime is a nonlinear attractor featuring extreme spectral broadening well beyond the gain bandwidth while producing pulses that can be compressed to nearly the transform limit.

Numerical simulations where performed by modeling the pulse evolution with the generalized nonlinear Schrödinger equation (GNLSE). When accounting for the effects of gain, dispersion, SPM, self-steepening and stimulated Raman scattering, the GNLSE can be written in the following form:

$$\frac{\partial A}{\partial z} = -\frac{\alpha(z,\omega)}{2}A - \left(\sum_{n\geq 2}\beta_n \frac{i^{n-1}}{n!}\frac{\partial^n}{\partial T^n}\right)A + i\gamma\left(1 + \frac{1}{\omega_0}\frac{\partial}{\partial T}\right) \quad \text{Equation 1}$$
$$\left(\left((1-f_r)A|A|^2 + f_r A \int_0^\infty h_r(\tau)|A(z,T-\tau)|^2 d\tau\right)\right)$$

where α is the spectrally dependent gain/loss coefficient and $\beta_n$ are the higher-order dispersion coefficients obtained by a Taylor series expansion of the propagation constant $\beta(\omega)$ around the center frequency $\omega_0$. The fractional contribution of the delayed Raman response to the nonlinear polarization is represented by $f_r$. Here, $f_r$=0.245 and an analytical form of the delayed Raman response $h_r(t)$ was taken. For numerical integration of the GNLSE the fourth-order Runge-Kutta method was used in the interaction picture. For gain/loss calculations we used a combined model that couples the laser rate equation and the GNLSE. In particular, an iterative procedure of gain/loss calculations was used in all numerical results presented in this paper.

The seed source for the experiments was a normal-dispersion fiber oscillator operating at 24 MHz repetition rate. The central wavelength of the oscillator was around 1030 nm and the pulse energy was 2.5 nJ. The pulse from the oscillator was compressed and spectrally filtered before the amplification. For the results presented in FIGS. 6-7, the amplifier was constructed from 5 meters of Yb-doped fiber (Nufern PM-YDF-5/130-VIII). For the results presented in FIGS. 7C-7D, a spectral filter before the amplifier was used to generate different seed pulses. For the results presented in FIG. 8, the amplifier was constructed from 3 meters of Yb-doped fiber (Nufern PLMA-YDF-10/125-VIII). For pulse compression, we used a grating compressor with transmission gratings (Lightsmyth T-1000-1040). Temporal pulse characterization was done with SHG-FROG (FROG-scan from Mesaphotonics), and a ptychographic algorithm was used to reconstruct pulses from the measured data.

Some example embodiments include a gain-managed nonlinear amplifier with large mode area fiber. The amplifier can deliver 1.2-0 and sub-40 fs pulses with the spectrum spanning from ~1000 to ~1180 nm. Longitudinal gain-loss evolution may play an essential role in pulse formation by comparing simulations with different gain models to experimental results.

The technology of high-power ultrafast fiber master-oscillator power-amplifier (MOPA) systems is valuable in industrial, defense, and scientific applications. Fiber amplifiers are critical components in MOPA systems because they can significantly alter the properties of the seed pulse during amplification. Gain-narrowing effects and nonlinear effects such as self-phase modulation (SPM) and stimulated Raman scattering (SRS) can adversely affect the pulse quality. Currently, there are two basic approaches for ultrafast fiber amplifiers: chirped-pulse amplification (CPA) or some form of nonlinear amplification (e.g., pre-chirp managed or self-similar amplifiers). In fiber CPA systems, the pulse duration is typically limited to longer than ~200 fs by gain narrowing, while nonlinear amplifiers can produce pulses as short as 24 fs but require carefully-chosen seed pulses and more-complex setups.

In some example embodiments, GMN amplifiers have a relatively narrowband seed pulse that experiences up to ~100-fold spectral broadening and is compressible to the transform-limited duration with a grating compressor. Experimental results and numerical simulations suggest that the pulse evolution in the GMN amplification regime is driven by a nonlinear attractor, which makes the GMN amplifier relatively insensitive to the seed pulse.

Consistent with some example embodiments is the extension of the GMN amplification regime to a large mode area (LMA) gain fiber. Short-pulse fiber amplifiers have been scaled to higher energy by use of fibers with increased mode area. In the GMN amplification regime, the scaling with mode area involves an intricate balance of nonlinear spectral broadening and gain shaping on the amplified pulse. In a demonstration of GMN amplification with a 10-μm core diameter, the pulse energy was limited to 180 nJ. Disclosed embodiments demonstrate a 30-μm core GMN amplifier that can achieve 1.2-0 pulses. The stable pulse energy scales slightly faster than the mode area (for the particular example of 30-μm core gain fiber) due to the gain-loss evolution. Three different numerical models of the pulse evolution have been compared. Only a model where the gain is calculated by solving the population rate equations simultaneously with the pulse evolution can adequately describe experimental observations.

Figures 17A, 17B, 17C, 17D:
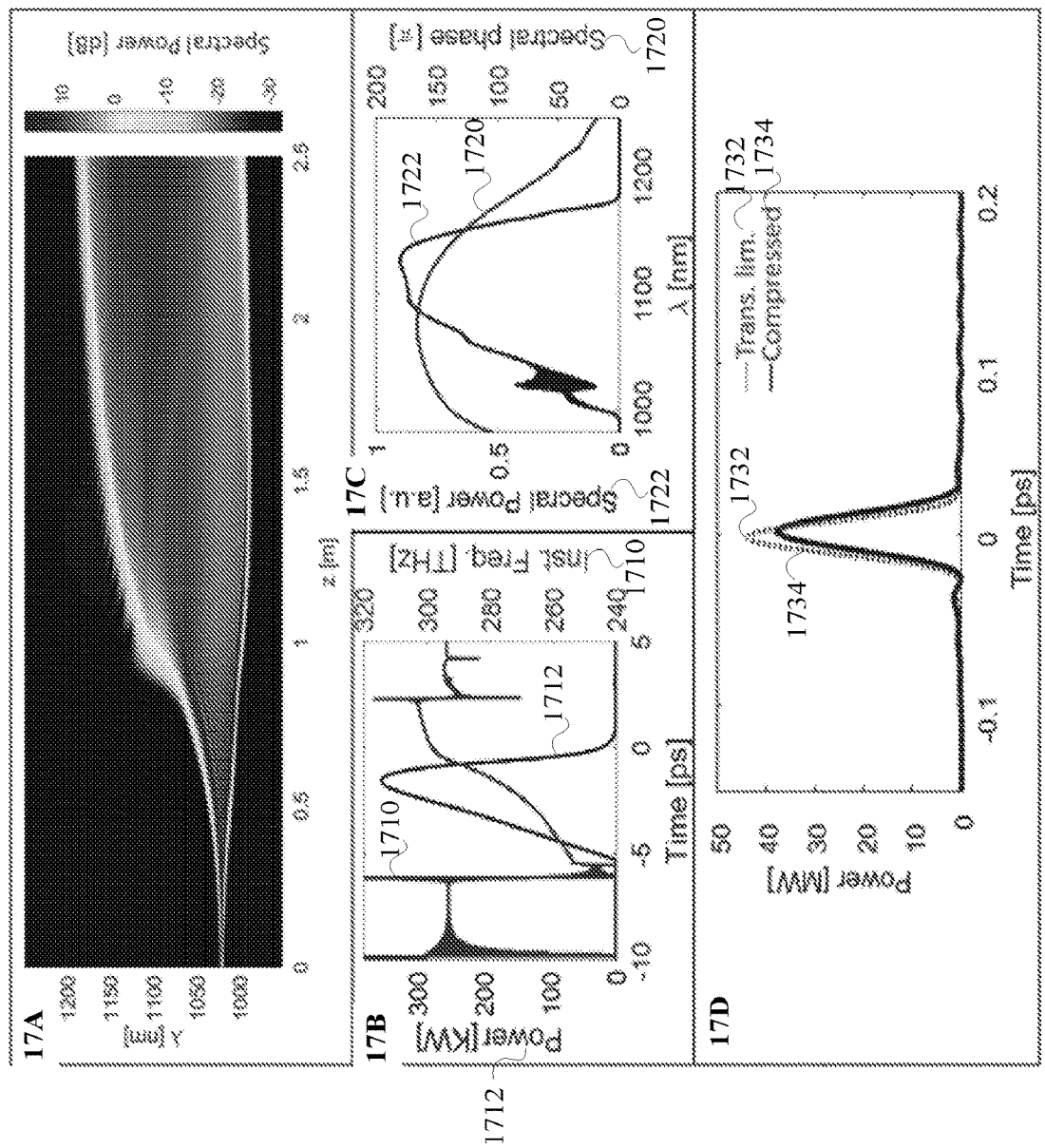
FIG. 17A shows spectral evolution of the amplified pulse in the gain fiber.
FIG. 17B shows chirp amplified pulse in the time domain: intensity and instantaneous frequency.
FIG. 17C shows chirp amplified pulse in spectral-domain: intensity and spectral phase.
FIG. 17D Compressed pulse and transform-limited pulse.

FIG. 17A illustrates the simulated spectral evolution of the pulse in an LMA ytterbium-doped fiber amplifier. With a 1-nJ, 0.6-ps Gaussian pulse at 1025 nm launched into a double-clad Yb-doped fiber amplifier with a 30-μm core and 400-μm cladding diameter (this corresponds to the fiber used below), which is co-pumped at 976 nm. A numerical model includes second- and third-order dispersion, along with SPM, self-steepening, SRS, and the gain calculated by solving the rate equation for the inversion simultaneously with the pulse evolution. The spectral evolution (FIG. 17A) is initially dominated by SPM spectral broadening (up to ~1 meter), followed by the gain-managed regime where the pulse central wavelength gradually shifts to longer wavelengths and the bandwidth continues to increase. Simulations show that the pulse can be amplified to ~1.3 μJ, at which point SRS becomes significant (e.g., one noise photon per frequency bin is added to the seed pulse). FIGS. 17A and 17C show the amplified pulse in time and spectral domains, respectively. Simulations reveal that the instantaneous frequency of the amplified pulse is not linear (FIG. 17B at 1710); however, it is matched well to the dispersion of a grating compressor. This can be seen from FIG. 17D where the numerically compressed pulse is very close to the transform-limited pulse (the full phase of the 1000 line/mm grating compressor in Littrow configuration). We note that there are some fringes at 1722 in the spectrum (FIG. 17C) that may occur in the GMN regime. The fringes arise from the interference of the main pulse with a small (0.1% of the energy) secondary pulse that is delayed around 2.8 ps and propagates in the absorption spectral region of 1020 nm.

Figure 18:
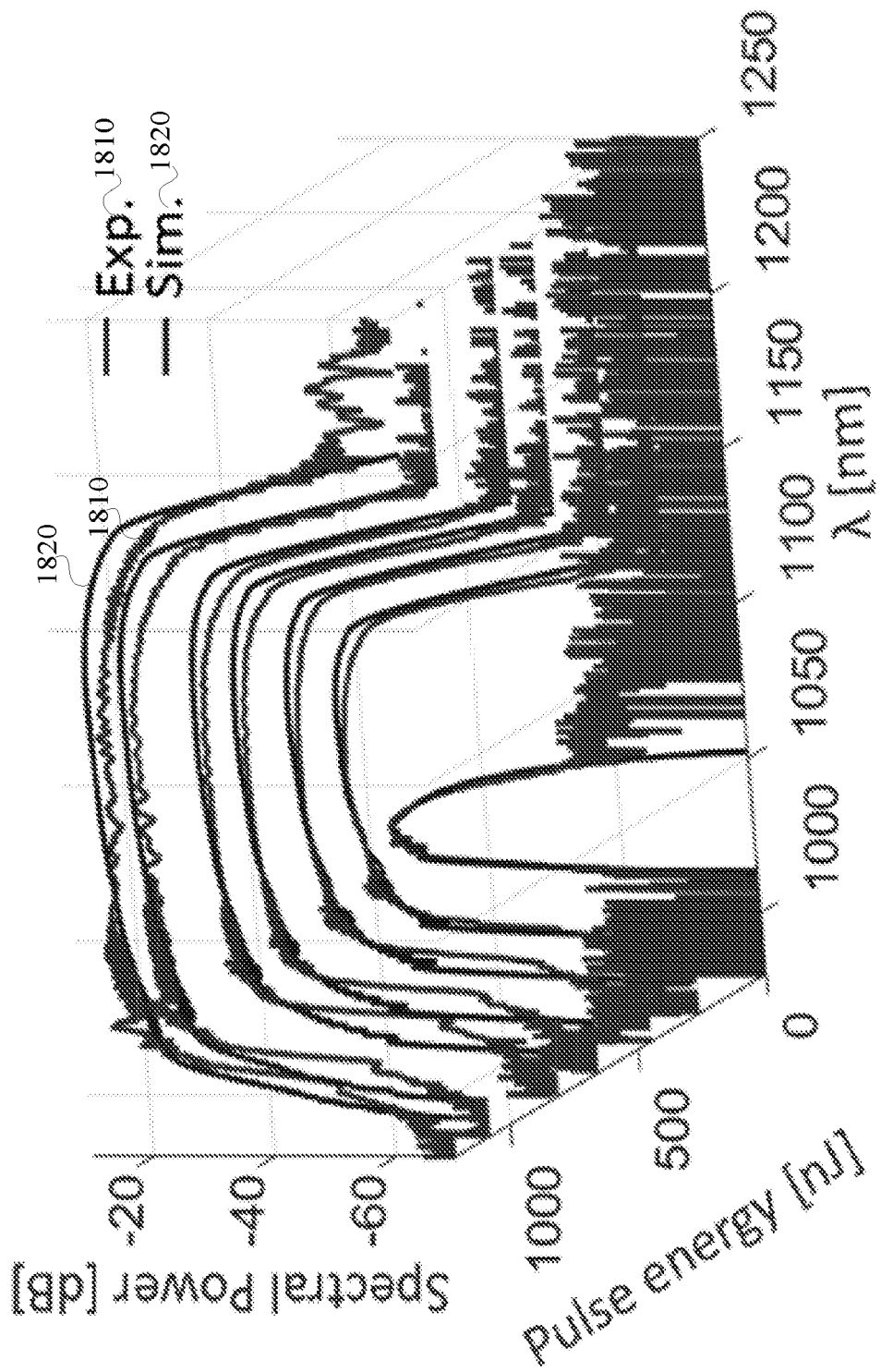
FIG. 18 shows measured spectra and simulated spectra for increasing pump power (different pump powers correspond to different pulse energies).

In an example of a fabricated device consistent with the numerical simulation, an amplifier with 2.5 meters of Yb-doped fiber (Nufern PLMA-YDF-30/400-VIII) was built. The gain fiber was coiled on a spool with 15 cm diameter to avoid the excitation of higher-order modes. The amplifier was seeded by 1-nJ and 0.6-ps transform-limited pulses at 1025 nm with a repetition rate of 5.4 MHz. The gain fiber was co-pumped with a 60-W multimode diode at 976 nm. FIG. 18 shows the measured spectra at 1810 and simulated spectra at 1820 for increasing pump power. The seed pulse can be amplified to, for example, 1.2 μJ (average power 6.5 W), at which point SRS becomes visible on the red side of the spectrum around 1225 nm. In the example amplifier, the maximum pulse energy was limited by SRS (restricted the maximum pulse energy by requiring that less than 2% of the energy be in the Raman-shifted part of the spectrum). Good agreement between the simulated and measured spectra in terms of bandwidth and spectral shape is observed for different pulse energies. A small systematic deviation between simulated and measured spectra on the red part of the spectrum that is more visible at higher pulse energies.

Scaling by the ratio of the mode areas would predict that the maximum pulse energy achieved in this experiment would be 3.9 times larger than that achieved with the 10-μm core fiber used in the initial demonstration of gain-managed amplification. However, a 7-fold increase was obtained. This scaling is a result of the intricate balance between the nonlinearly-evolving pulse and the co-evolving spectrally-dependent gain/loss. In contrast to a flat gain model, where the pulse energy scales with the mode area, in a GMN amplifier the gain/loss evolution strongly depends on the pump absorption. The pump absorption, in turn, depends on the ratio of signal to pump cores and the doping concentration. The maximum pulse energy to may increase by more than the ratio of mode areas.

Figure 19:
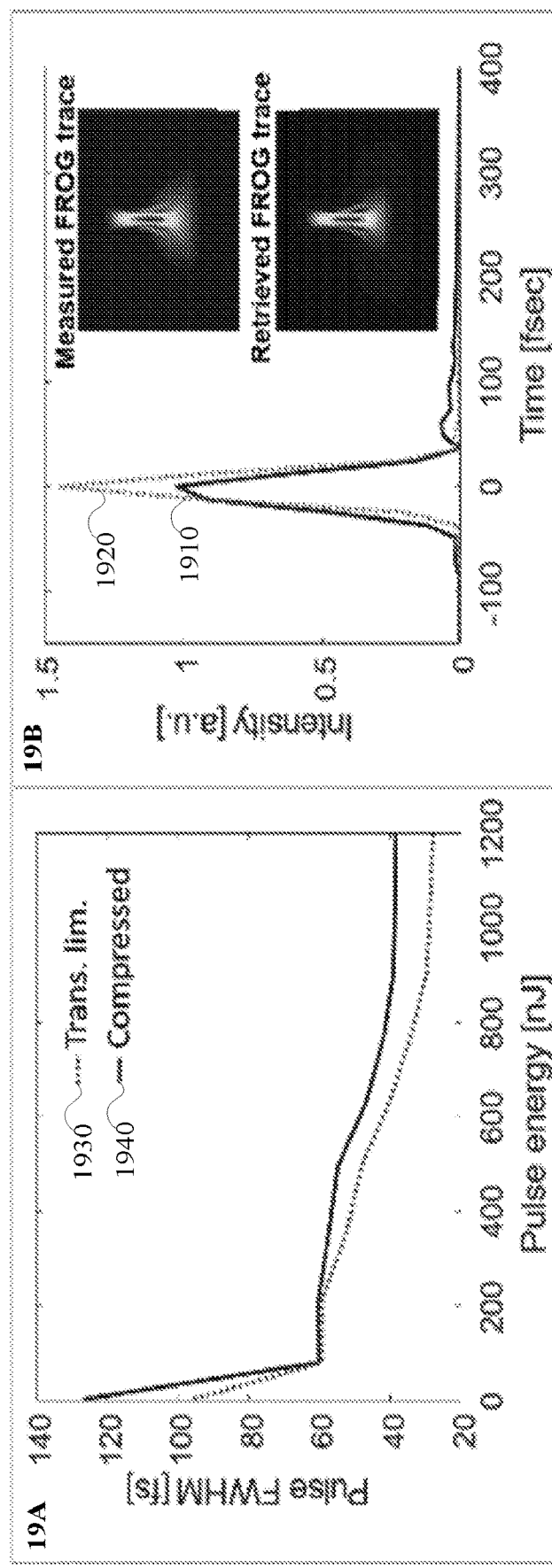
FIG. 19A shows measured compressed pulse duration at 1940 and calculated transform-limited pulse duration at 1930 vs pulse energy.
FIG. 19B shows measured compressed 1.2-µJ pulse at 1910 and transform-limited pulse.

In some example embodiments, the amplified pulses were compressed with a pair of gratings with 1000 lines/mm. The grating separation in the compressor may be adjusted separately for each pulse energy to get the shortest pulse duration. Pulses may be characterized by second harmonic generation frequency-resolved optical gating (FROG). The measured pulse duration decreases with pulse energy, but also deviates gradually from the transform-limited value for pulse energies above 200 nJ (see, for example, FIG. 198A). This is because the chirp of the amplified pulse depends on the balance between gain evolution and nonlinear broadening, which are functions of the fiber parameters. Numerical simulations show that the pulse compression quality can be improved by using appropriate gratings since the cubic phase of the amplified pulses has the opposite sign of the grating compressor. The shortest measured pulse duration was 38 fs full-width at half-maximum for 1.2-µJ pulses. FIG. 19B shows the measured pulse shape at 1910 and the corresponding transform-limited pulse at 1920.

Figure 20:
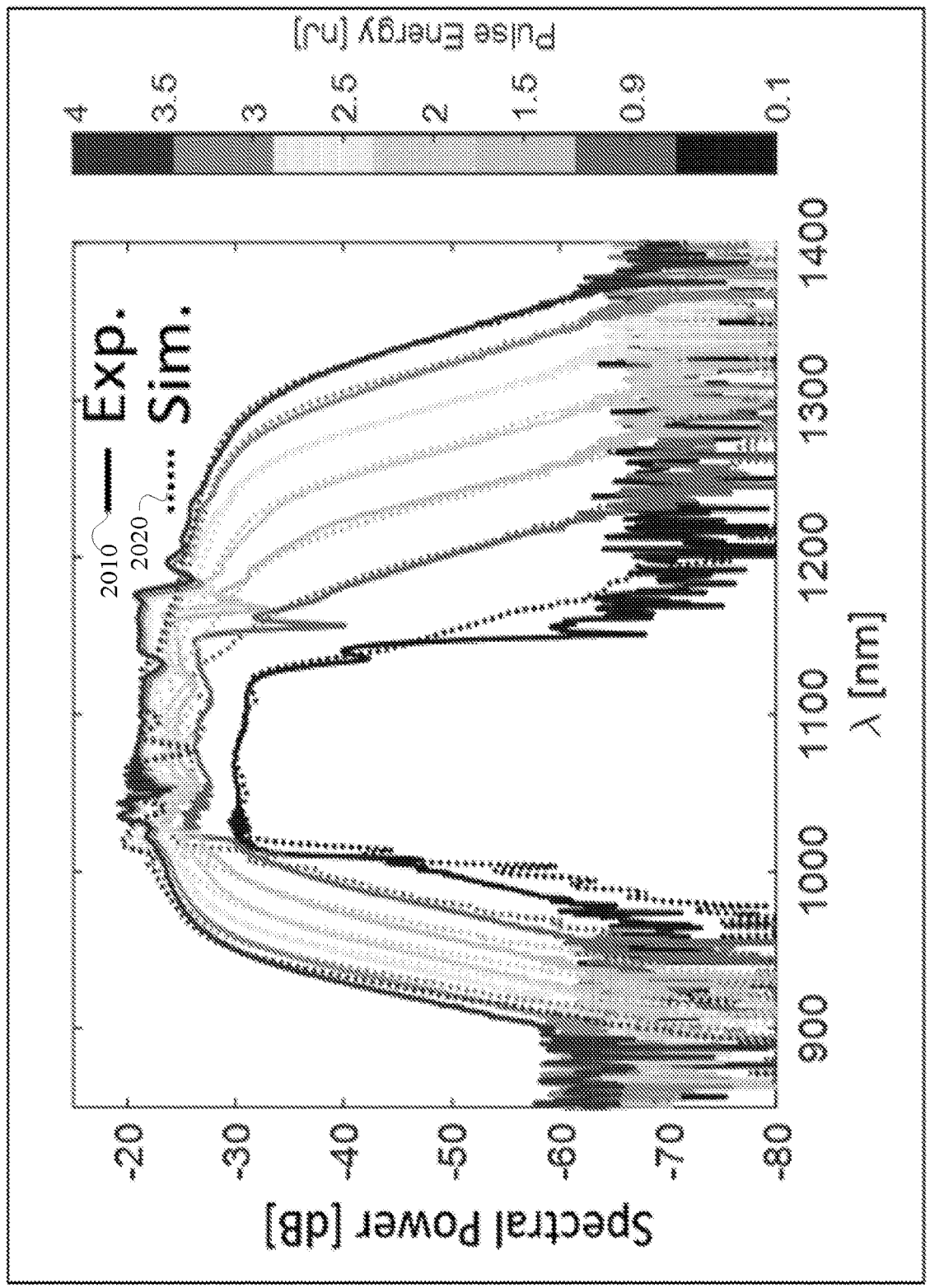
FIG. 20 shows measured spectra and simulated spectra for increasing pulse energy, indicated by the color scale.

It is important to assess the quality of pulses generated via new nonlinear pulse evolutions. A fraction of the compressed pulse was coupled into 1 meter of polarization-maintaining fiber and the spectrum at the end of the fiber was measured as a function of the input pulse energy. FIG. 20 shows measured and simulated spectra for different input pulse energies. The input pulses in the simulations were the FROG reconstructions (as in FIG. 19B) with the corresponding energies. The excellent agreement between measured and simulated spectra is a verification of the 30-MW peak power of the pulses from the amplifier.

Figures 21A, 21B:
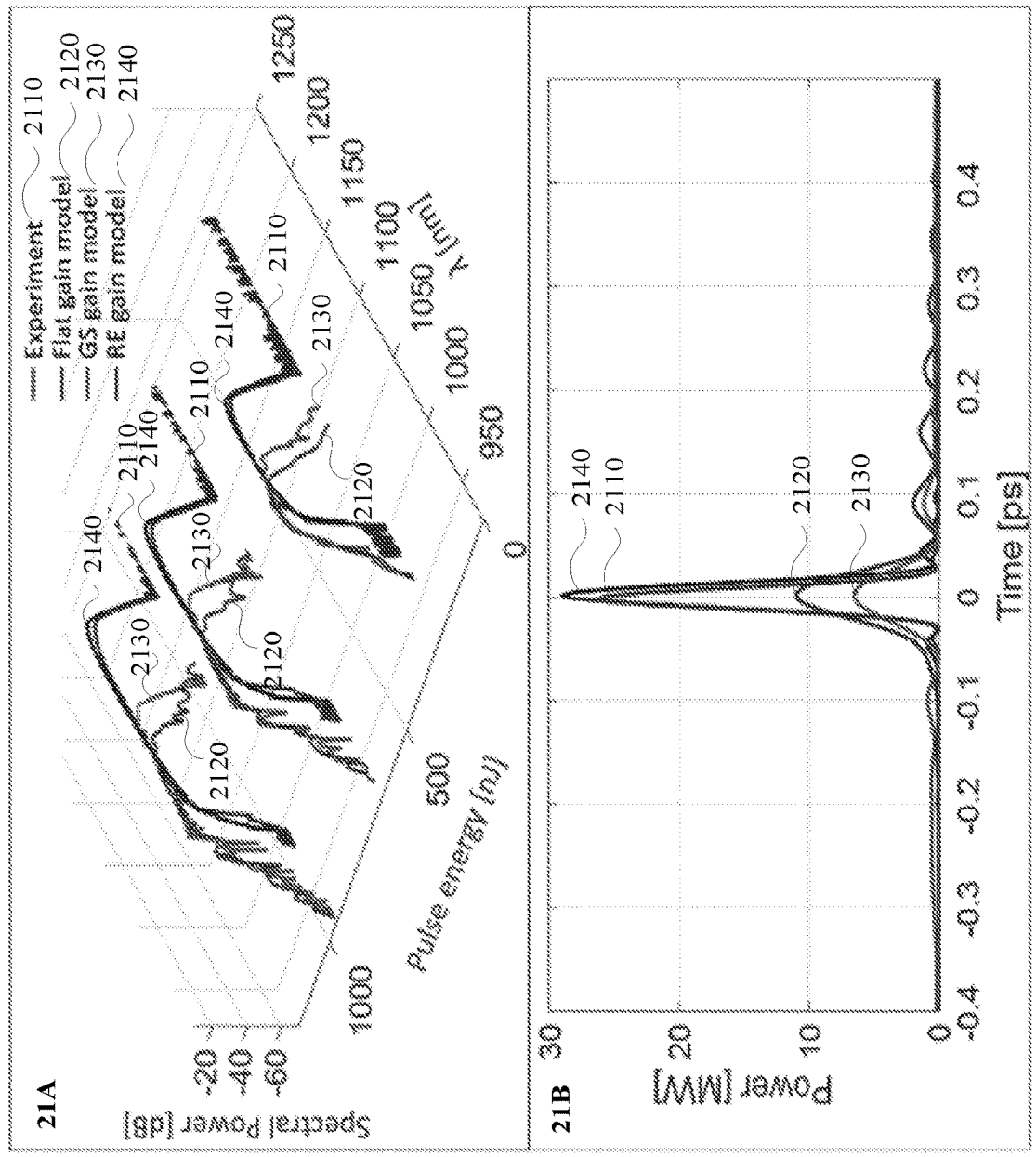
FIG. 21A shows experimental spectra and simulated spectra for three gain models: flat gain, Gaussian gain with saturation (GS gain model), and rate equations (RE gain model).
FIG. 21B shows measured and numerically compressed pulses for 900-nJ pulse energy.

To investigate the extent of gain management in the results presented above, we compare our experimental results with three different simulation models: 1) the gain is calculated by solving the rate equations for the population inversion simultaneously with the pulse evolution (RE gain model), 2) the gain spectrum is taken to be a Gaussian, with homogeneous saturation (GS gain model), 3) the gain is constant across the spectrum (flat gain model). The same seed pulse and fiber parameters were used in all simulations; the only difference was the gain model. In simulations with the GS gain model, the gain saturation was adjusted to imitate varying pump power. In simulations with flat gain, the small-signal gain was adjusted to imitate varying pump power. FIG. 21A shows the measured spectra along with simulations with the three models for 200-nJ, 600-nJ, and 900-nJ pulses. It is clear that the measured spectra are accurately modeled only by the RE gain model. Furthermore, the RE gain model predicts that the chirp of the amplified pulse will be well-compensated by a grating compressor, so the pulse can be compressed close to transform-limited duration. Both the GS and flat gain models predict amplified pulses with complex chirps that cannot be compensated well with a grating compressor. FIG. 21B shows an example of numerically compressed 900-nJ pulses for the three considered gain models along with the measured pulse.

In experiments the pulse energy is shown to be limited by SRS. Techniques for suppression of SRS may play a role in further improvement of GMN amplifiers. The combination of Raman-suppression techniques with further scaling of the GMN regime to LMA photonic crystal fibers and LMA tapered fibers may bring the performance of fiber MOPA systems to the multi-µJ and sub-40 fs regime. The disclosed simulations and devices do not show any indication of thermal mode instabilities. Such instabilities are not expected at the average powers of ~10 W disclosed here.

The disclosed performance is achieved with a simple and practical device. The GMN amplifier is seeded by a modest 600-fs, 1 nJ pulse, which can be generated directly by compact and robust oscillators.

In summary, a gain-managed nonlinear amplifier with large mode area fiber that delivers 1.2-µJ and sub-40 fs pulses was built and modelled. Scaling by mode area is intrinsically complex owing to the dynamic evolution of the gain. However, the maximum pulse energy scales at least linearly with the mode area. The longitudinal gain-loss evolution in such amplifiers plays a role in pulse formation. The combination of performance and simplicity of the GMN amplifier will enable a variety of applications.

Additional description of the FIGs. is provided below.

FIG. 1 shows a simulated example of GMN amplification regime. The temporal intensity at 110 and instantaneous frequency at 120 are plotted for FIG. 1A the seed pulse, FIG. 1B the self-similar pulse, FIG. 1C the pulse beyond the self-similar regime, and FIG. 1D the GMN regime.

FIG. 2 shows simulated pulse evolution in Yb-doped fiber. The top two rows FIGs. 2A-2F show the spectral evolution of the amplified pulse (220) and saturating gain spectrum (210), while the bottom two rows FIG. 2G-2L show the pulse's temporal evolution.

FIG. 3 shows pulse and gain evolution in a GMN amplifier. FIG. 3A shows longitudinal evolution of the gain. Black dashed curves mark the pulse's spectrum (central wavelength±the root-mean-square bandwidth). FIG. 3B shows peak power (310) and pulse energy (315) as a function of the propagation distance in the gain fiber. FIG. 3C Bandwidth (320) and chirped uration (325) of the pulse as a function of the propagation distance in the gain fiber.

FIG. 4 shows pulses generated by a GMN amplifier. FIG. 4A Chirped output pulse from the example presented in FIG. 1. FIG. 4B Compressed pulse (425) and transform-limited pulse (420). The insets in FIG. 4A and FIG. 4B show spectrograms of the chirped pulse (gated by 1-ps Gaussian window) and the compressed pulse (gated by 5-fs Gaussian window), respectively.

FIG. 5 shows numerical evidence of a nonlinear attractor. FIG. 5A shows different seed pulses and their corresponding spectrograms. TL: transform-limited. FIG. 5B shows evolution of the peak power for each seed. FIG. 5C shows amplified pulses produced with the different seeds, taken at the same power level (indicated by the dashed black line in FIG. 5B, arbitrarily chosen to be 6.6 kW).

FIG. 6 shows an experimental demonstration of a GMN amplifier. FIG. 6A shows measured (610) and simulated (615) output spectra for increasing pump power (labeled with the output energies). FIG. 6B shows compressed (620) 107-nJ pulse and transform-limited pulse (625). Insets in FIG. 6B show measured and retrieved SHG-FROG traces.

FIG. 7 shows experimental evidence of a nonlinear attractor. FIG. 7A shows output spectra of a GMN amplifier and FIG. 7B the corresponding compressed pulses for a constant seed spectrum (black dashed curve in 7A), with the indicated seed pulse energies. FIG. 7C Output spectra and pulse shapes of a GMN amplifier seeded with constant seed energies (inset: seed spectra), and FIG. 7D corresponding de-chirped pulses.

FIG. 8 shows a direct measurement of chirped pulses from a GMN amplifier. FIG. 8A shows measured (810) and simulated (815) spectra for increasing pump powers. FIG. 8B shows measured (820) and simulated (825) pulse shapes that correspond to the 77-nJ result in FIG. 8A. FIG. 8C shows measured compressed pulse (830) and calculated transform-limited pulse (835).

Figures 9A, 9B:
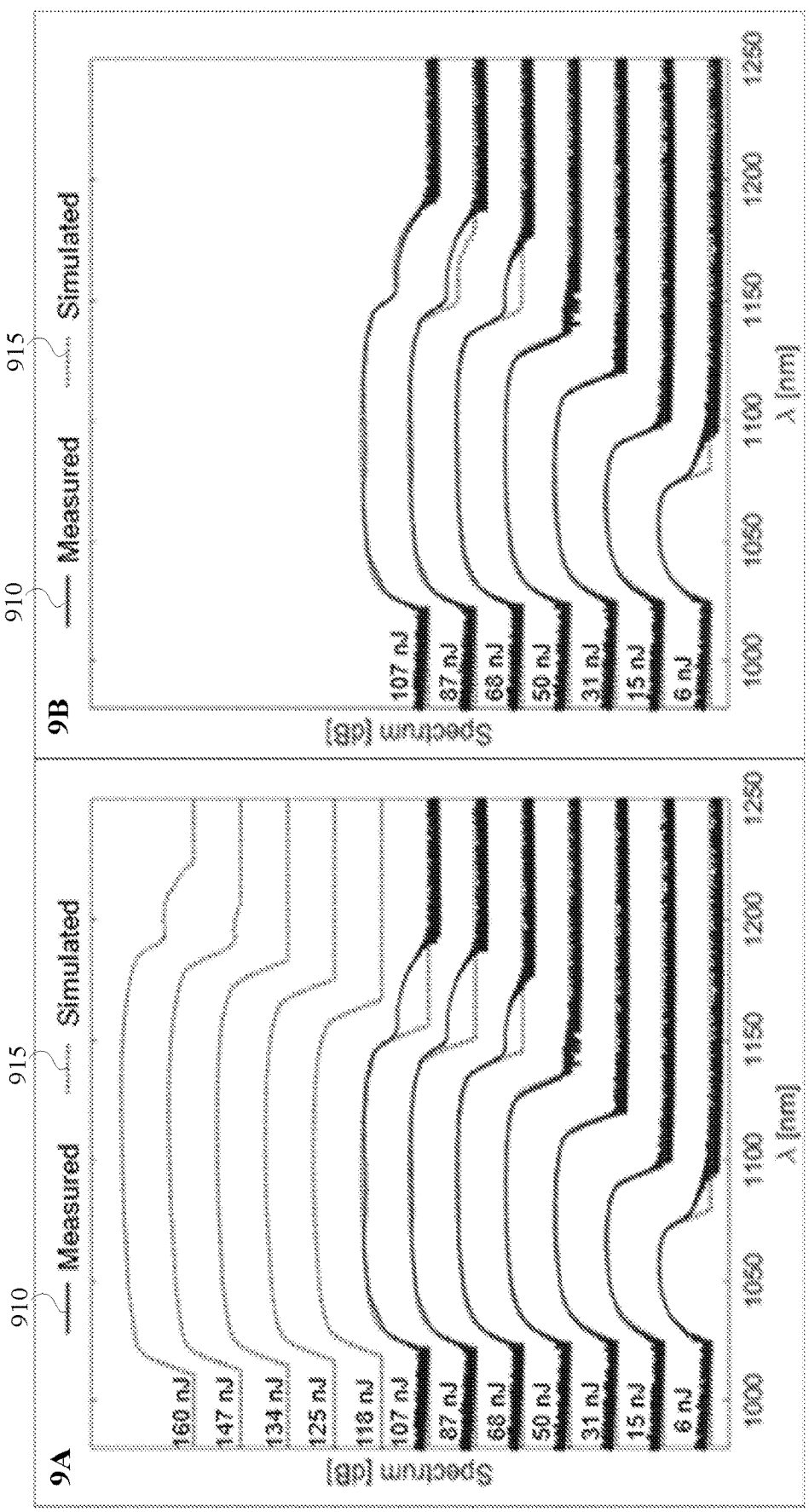
FIGS. 9A-9B depict SRS effects in experimental and simulated GMN amplifier.

FIGS. 9A-9B show an example of differences between numerical simulation and experimental results are analyzed and presented in FIG. 5. Experimentally, the energy of the amplified pulse is limited by stimulated Raman scattering, visible on the long-wavelength edge of the measured spectra for pulse energies of 68 nJ and above (solid blue curves in FIG. 5). In the numerical simulation, shot noise was added with one photon per frequency bin to the seed pulse. In this case, our simulations predict that the pulse energy could be increased (by increasing pump power) to 160 nJ [FIG. 9A] before we start to observe significant Stokes waves. To understand this discrepancy between simulations and experiments, we perform several simulations where we vary the amount of shot noise in the seed pulse.

FIGS. 9A-9B show SRS effects in experimental and simulated GMN amplifier. FIG. 9A shows compression of experimental results with simulations where 1 photon per frequency band shat-noise was added to the seed pulse. FIG. 9B shows compression with simulations where 1000 photons per frequency band shot-noise were added to seed pulse. Curves 920 show experimental results and curves 925 show results from numerical simulations.

If the shot noise is increased to 1000 photons per frequency bin, the simulated spectra agree with the experimental results [FIG. 9B]. One reason for this may be the generation of amplified spontaneous emission near 1150 nm at the beginning of the gain fiber.

Figure 10:
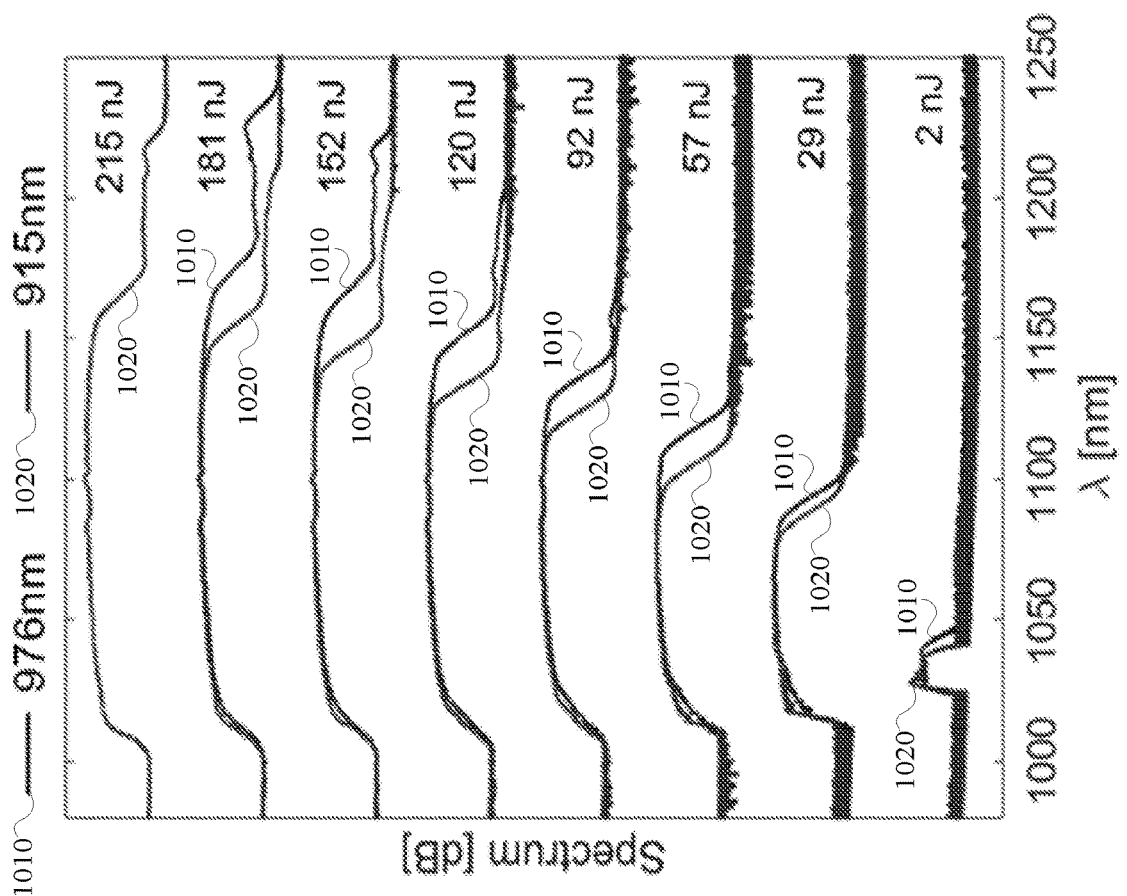
FIG. 10 depicts example plots of amplitude in dB vs. wavelength for a GMN amplifier. Some curves show spectra obtained with 976 nm pump, and other curves show spectra obtained with 915 nm pump.

FIG. 10 shows that pulse energies above 200 nJ are available from a 10-μm-core fiber amplifier based on the GMN regime. In addition, test results show that a GMN amplifier can be pumped at different wavelengths. In particular, pumping a GMN amplifier at 915 nm can be used to lead to slightly more energetic and more broadband outputs. FIG. 10 shows experimentally measured spectra for increasing pump power from a GMN amplifier. For this amplifier, a gain fiber of 5 meters using the Nufern PLMA-YDF-10/125-VIII fiber was used and the input pulses were pumped by using 0.7-ps transform-limited seed pulses centered at 1028 nm. The amplifier was co-pumped either with a 976 nm diode (curves 1010 in FIG. 10), or with a 915 nm diode (curves 1020 in FIG. 10). The maximum measured pulse energy was 215 nJ with 915 nm pump and 181 nJ with 976 nm pump. Under both pump wavelengths, the maximal pulse energy was limited by production of Stokes waves.

Figures 11A, 11B, 11C, 11D, 11E, 11F, 11G, 11H, 11I, 11J, 11K, 11L:
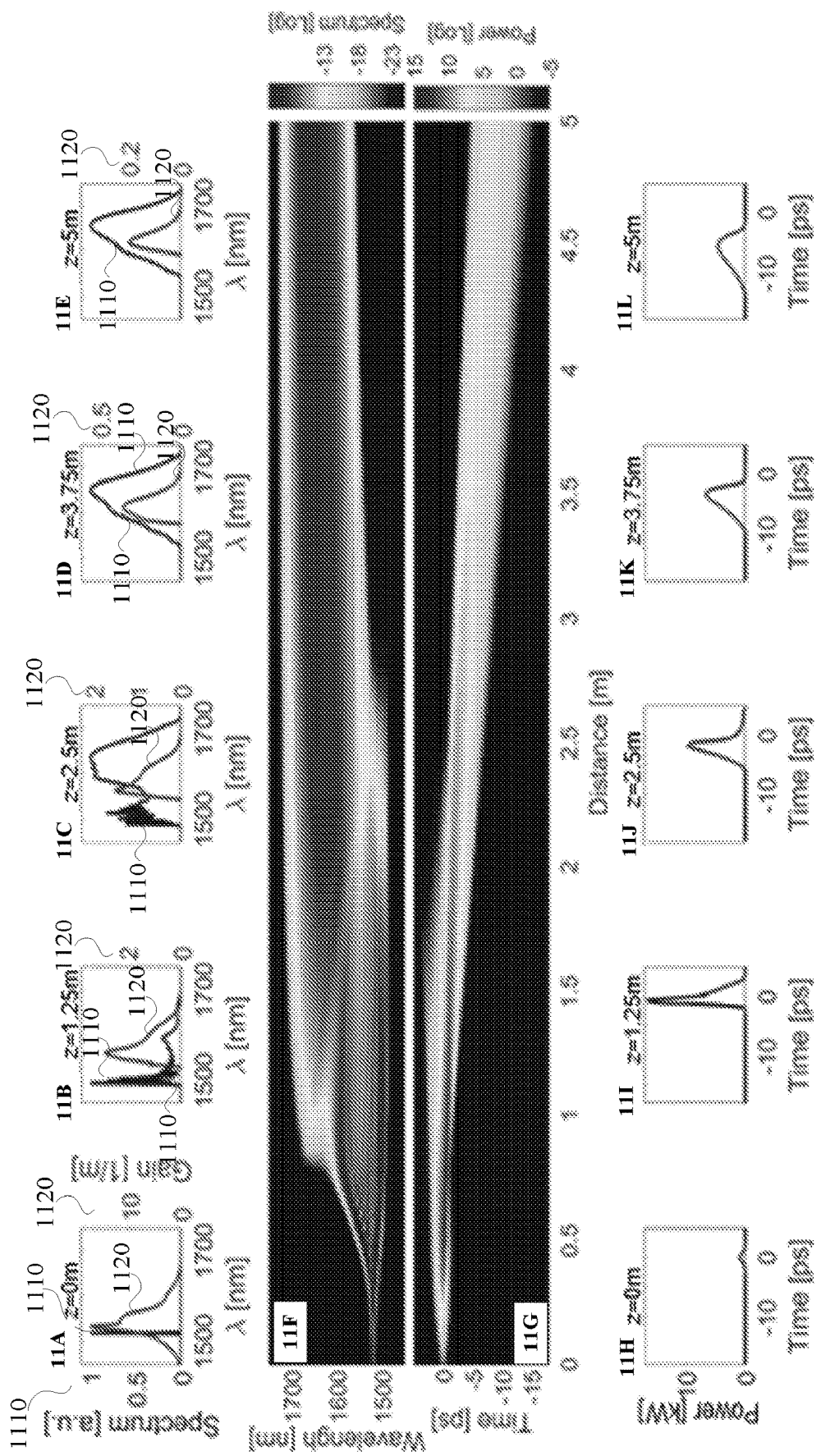
FIGS. 11A-11L depict an example of a simulation of pulse evolution in an Er-doped fiber.

FIGS. 11-12 show a numerical example of a GMN amplifier using Er-doped gain fiber. In this example, a 1-nJ, 0.8-ps, transform-limited, sech-shaped seed pulse centered at 1520 nm is launched into an Er-doped fiber amplifier that is co-pumped at 980 nm. Computer simulation was conducted for a highly-doped Er fiber (RightWave® EDF150 from OFS), where $\beta_2=36$ ps$^2$/km and $\beta_3=0.07$ ps$^3$/km. During the first meter of the gain fiber, the pulse evolution is dominated by SPM [FIGS. 11A-11B]. As in the example with Yb gain, the pulse evolves to a smooth, asymmetric temporal shape instead of experiencing the expected wave-breaking distortions. The longitudinal evolution of the gain spectrum is shown in FIGS. 11A-11E by the curves 1120.

Specifically, FIG. 11 shows an example simulation of pulse evolution in Er-doped fiber. Top panels 11A-11F show spectral evolution of the amplified pulse and saturated gain spectrum. Bottom panels 11G-11L show the temporal evolution of the amplified pulse.

Figures 12A, 12B, 12C:
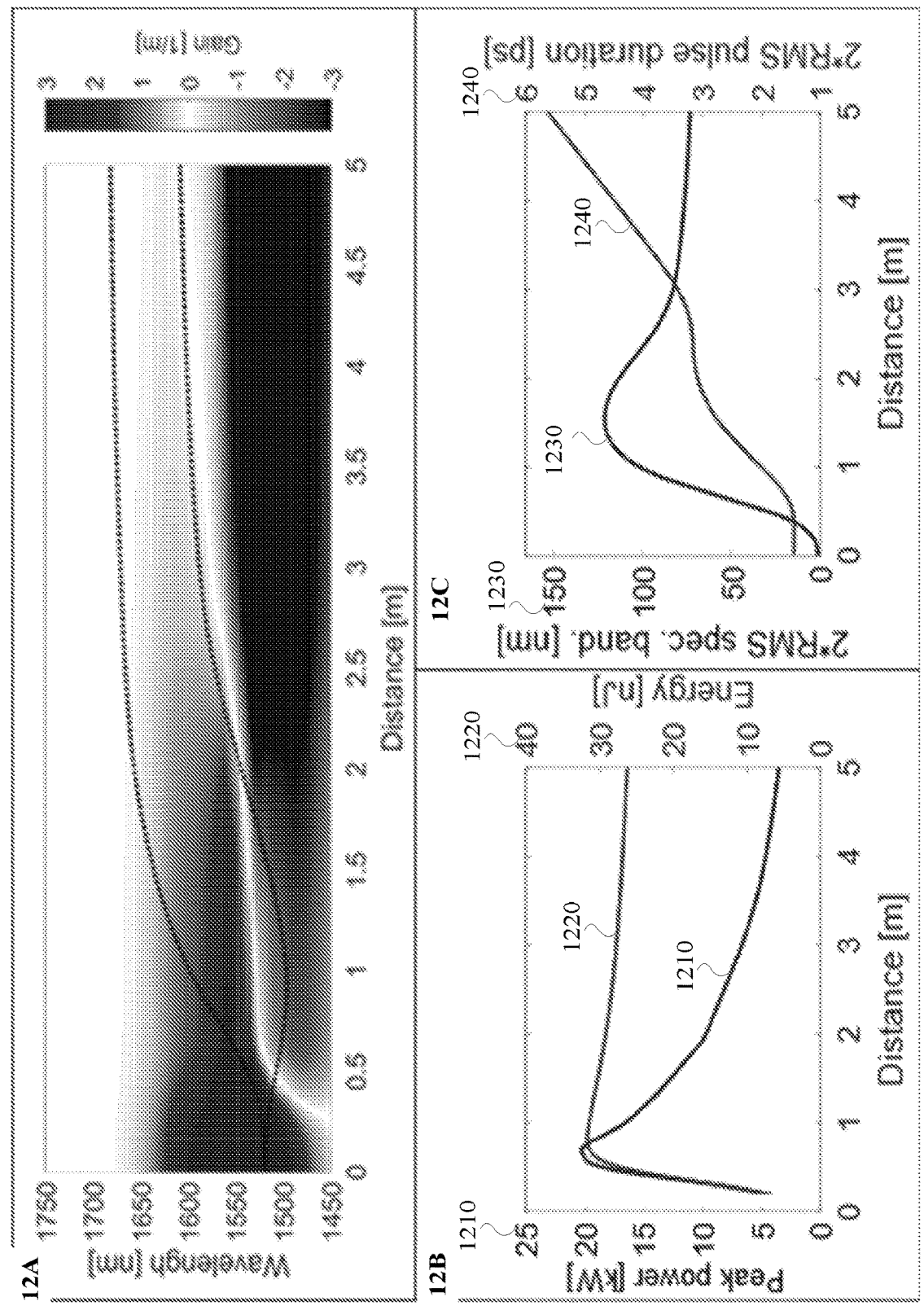
FIGS. 12A-12C depict examples of pulse and gain evolution in GMN amplifier.

FIG. 12A shows the evolution of the gain/loss in the amplifier over the length of the gain fiber. The black dashed curves mark the root-mean-square bandwidth of the pulse spectrum. FIGS. 12B-12C show the evolution of the pulse parameters.

FIG. 12 shows examples of pulse and gain evolution in a GMN amplifier. FIG. 12A Longitudinal evolution of the gain. Black dashed curves mark the spectrum (central wavelength±the root-mean-square bandwidth). FIG. 12B shows peak power (1210) and pulse energy (1220) vs. propagation distance. FIG. 12C shows bandwidth (1230) and duration (1240) of the pulse vs. propagation distance.

Figures 13A, 13B:
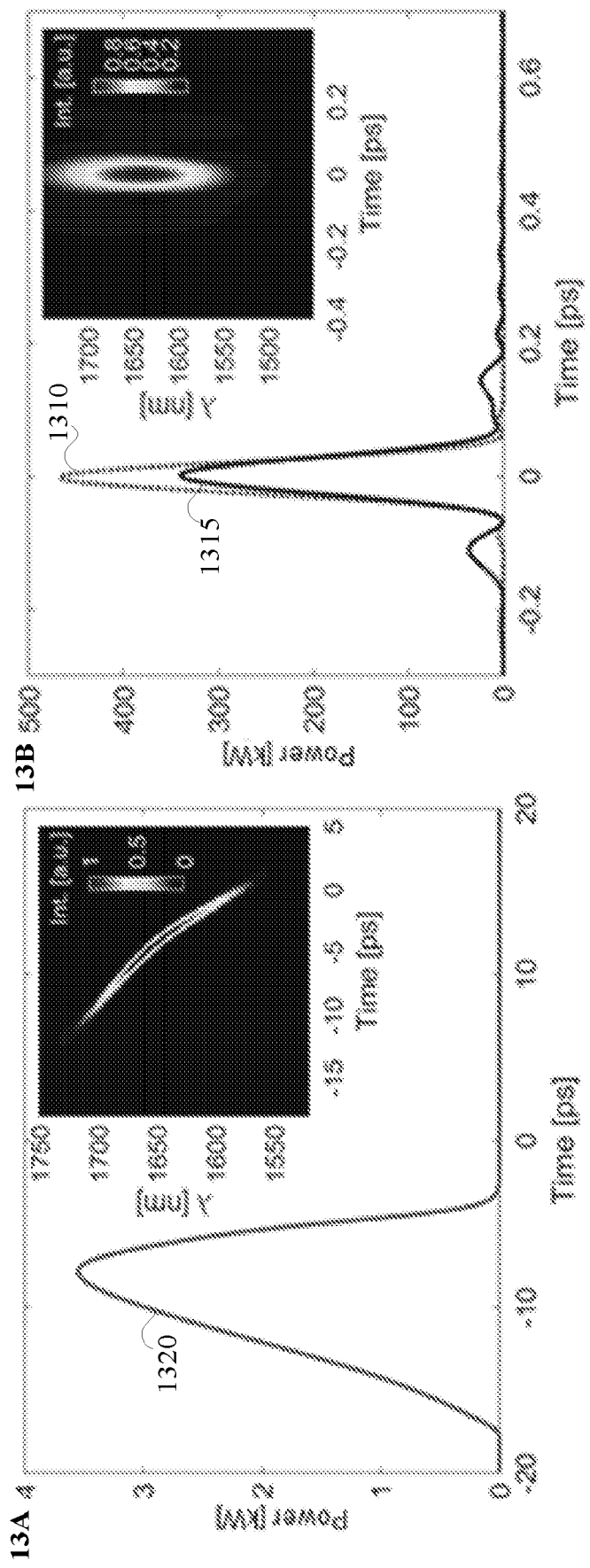
FIG. 13A shows an example of an asymmetric, steady-state pulse shape at the output of the Er-doped amplifier.
FIG. 13B shows an example of a pulse compressed with a grating compressor.

FIG. 13A shows an asymmetric, steady-state pulse shape at the output of the amplifier. FIG. 13B shows pulse compressed with a grating compressor (solid blue curve). The duration of the compressed pulse is 61 fs.

FIG. 13 shows examples of pulses generated by an Er-doped GMN amplifier. FIG. 13A shows chirped output pulse 1320 from the example presented in FIG. 11. FIG. 13B shows compressed pulse (1315) with full-width-half-max duration of 61 fs, and transform-limited pulse (curve 1310) with full-width-half-max duration 57 fs. Insets in FIG. 13A and FIG. 13B show spectrograms of the chirped pulse (gated by 1-ps Gaussian window) and the compressed pulse (gated by 5-fs Gaussian window), respectively.

FIG. 13 shows that in addition to enabling the generation of pulses much shorter than the gain-narrowing limit, GMN amplifiers could be used to realize energetic, ~100-fs pulses in spectral regions not traditionally covered by Yb. Such wavelength-tunable pulses may serve a crucial role in driving hyperspectral nonlinear microscopes or mid-infrared sources.

Figures 14A, 14B, 14C:
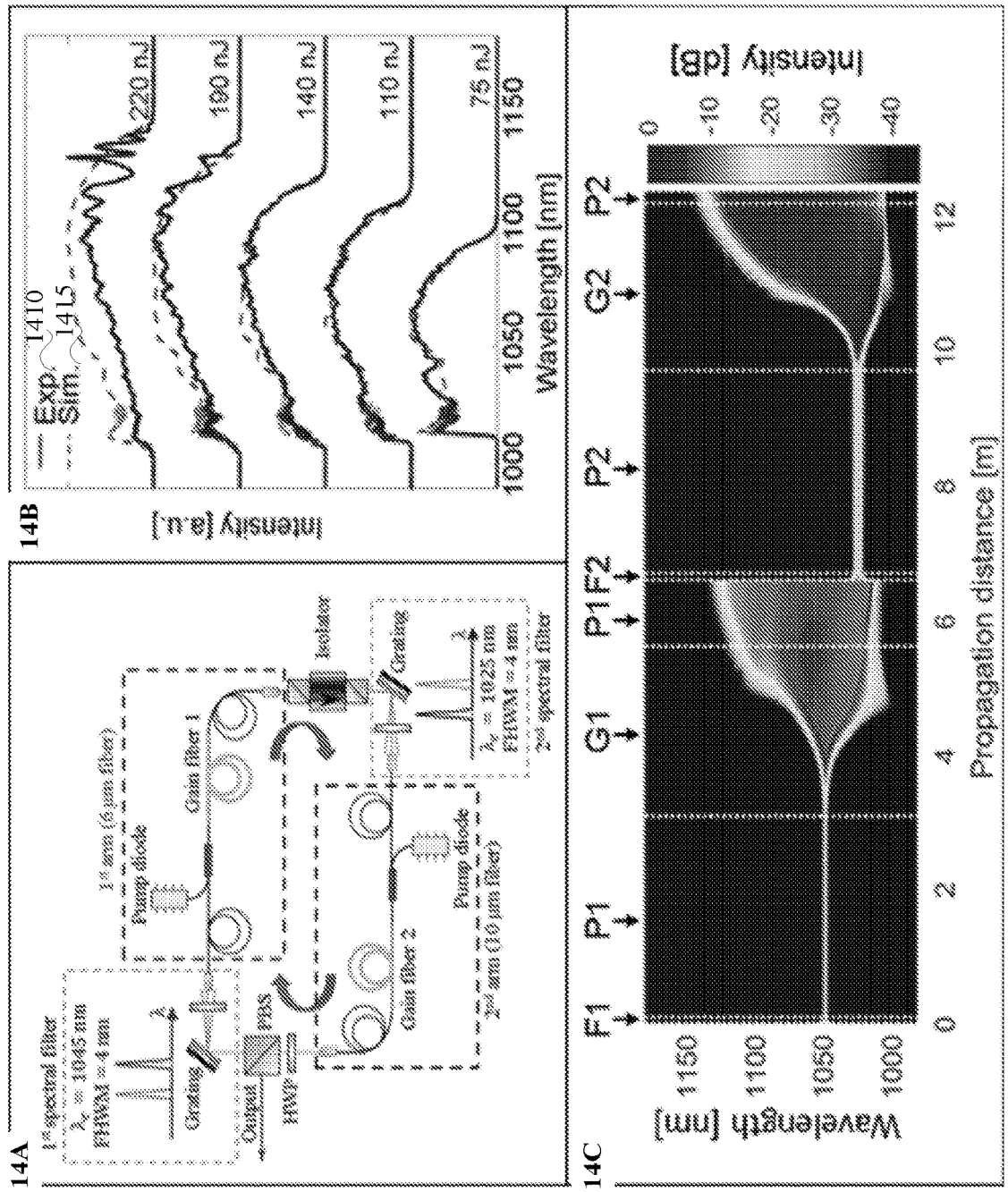
FIG. 14A-14C depict an example of pulse evolution in a ring Mamyshev oscillator.
Figures 15A, 15B, 15C:
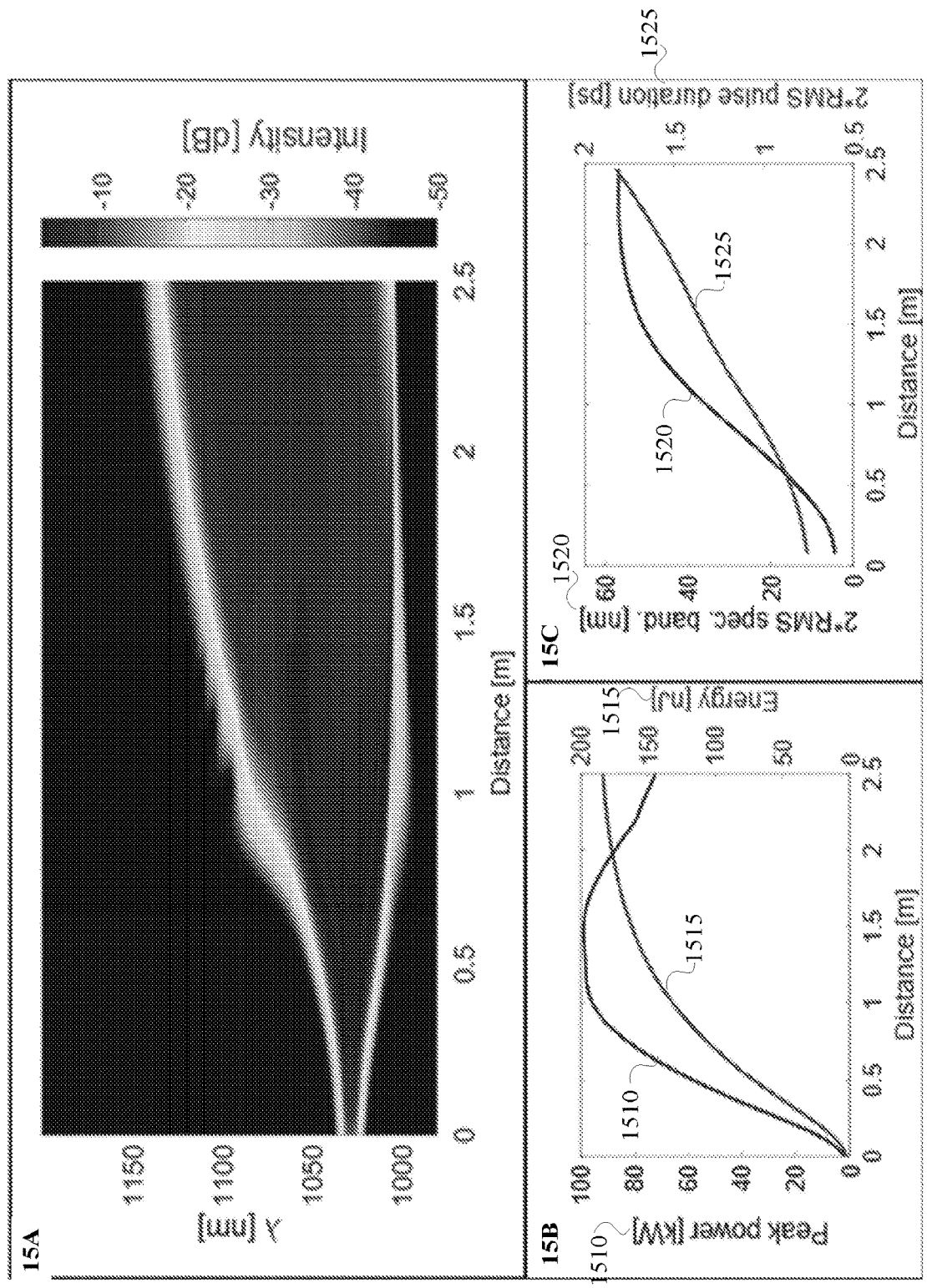
FIGS. 15A-15C depict an example of pulse evolution in the last gain segment of the ring Mamyshev oscillator.

FIG. 14 shows that gain-managed-nonlinearity underlies the pulse evolution in high-performance, Mamyshev fiber oscillators. To understand the pulse evolution in the Mamyshev oscillator, we reanalyzed our numerical simulations. FIG. 14A shows a schematic of the laser. FIG. 14B shows the measured (1410 solid curves) and simulated (1415 dashed curves) spectra for increasing pump power. FIG. 14C shows the spectral evolution in the laser cavity of the simulation for 190-nJ output pulses. To understand the pulse evolution in the Mamyshev oscillator, we highlight the spectral evolution in the last gain segment (G2) of the laser cavity [FIG. 15A]. As shown in FIG. 15A, the spectral pulse evolution closely resembles that presented in FIG. 1F. During the first meter of the gain fiber, the pulse evolution is dominated by SPM, and afterwards, the pulse begins evolving toward a smooth spectral shape. Similarly, FIGS. 15B-15C show evolution of the pulse parameters in the gain segment.

FIG. 14 shows an example of pulse evolution in a ring Mamyshev oscillator, reproduced from Ref 3. FIG. 14 shows a schematic of the laser cavity. FIG. 14B shows experimentally measured (solid curves 1410) and simulated (curves 1415) spectra for a range of pulse energies. FIG. 14C Spectral evolution of the pulse in the cavity for 190-nJ output pulses.

FIG. 15 shows pulse evolution in the last gain segment of the ring Mamyshev oscillator. FIG. 15A shows an example of spectral pulse evolution. FIG. 15B shows peak power (1510) and pulse energy (1515) vs. propagation distance. FIG. 15C Bandwidth (1520) and chirped duration (1525) vs. propagation distance.

Figure 16:
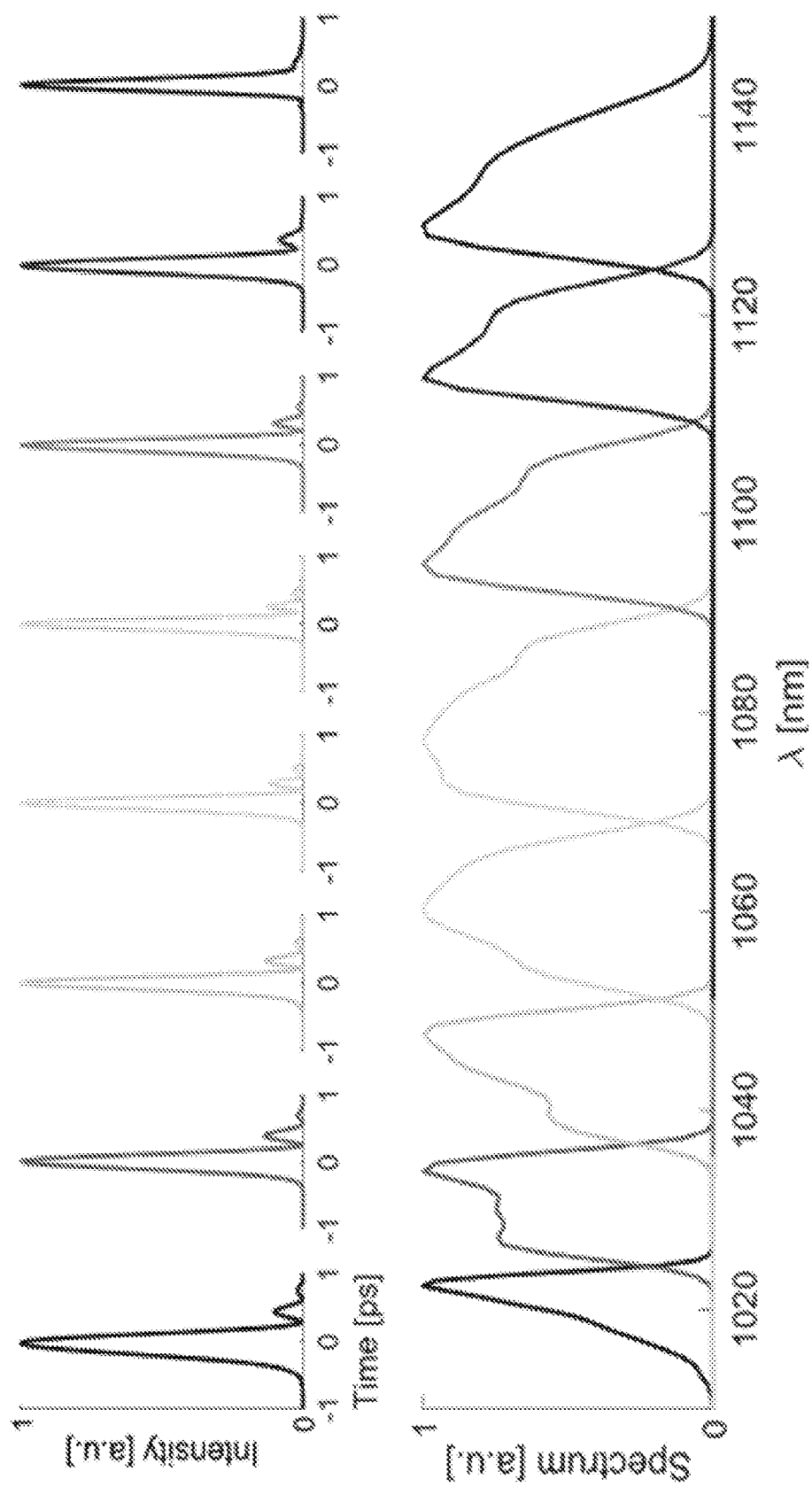
FIG. 16 depicts example of an experimental demonstration of tunable pulse generation from a GMN amplifier. Top and bottom panels show measured pulses and corresponding spectral slices from the output of a GMN amplifier.

FIG. 16 shows an example of an experimental demonstration of tunable pulse generation from a GMN amplifier. FIG. 16 shows that the extremely broadband amplified spectrum can be filtered to generate 200-fs, 5-nJ pulses tunable from 1020 nm to 1140 nm. Simulations suggest that the GMN amplifier output spectrum can be extended to allow tuning to nearly 1250 nm, making this amplification regime even more attractive to applications. Top and bottom panels show measured pulses and corresponding spectral slices from the output of a GMN amplifier.

FIG. 17A shows spectral evolution of the amplified pulse in the gain fiber. FIG. 17B shows chirp amplified pulse in the time domain: intensity at 1712 and instantaneous frequency at 1710. FIG. 17C shows chirp amplified pulse in spectral-domain: intensity at 1722 and spectral phase (red curve). FIG. 17D Compressed pulse at 1734 and transform-limited pulse at 1720. The compressed pulse was produced numerically from the chirped amplified pulse by applying the optimal grating pair compressor phase.

FIG. 18 shows measured spectra at 1810 and simulated spectra at 1820 for increasing pump power (different pump powers correspond to different pulse energies).

FIG. 19A shows measured compressed pulse duration at 1940 and calculated transform-limited pulse duration at 1930 vs pulse energy. FIG. 19B shows measured compressed 1.2-µJ pulse at 1910 and transform-limited pulse at 1920. The insets in FIG. 19B show measured and reconstructed FROG traces.

FIG. 20 shows measured spectra (solid curves 2010) and simulated spectra (dashed curves 2020) for increasing pulse energy, indicated by the color scale.

FIG. 21A shows experimental spectra at 2110 and simulated spectra for three gain models: flat gain at 2120, Gaussian gain with saturation (GS gain model at 2130), and rate equations (RE gain model at 2140). FIG. 21B shows measured and numerically compressed pulses for 900-nJ pulse energy.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A pulsed laser apparatus comprising:
   an input coupler configured to receive pumping light from one or more pumping light sources and a seed pulse from a seed pulse generator; and
   a doped optical fiber that exhibits normal dispersion, has an input port coupled to the input coupler at a first end to receive the pumping light and the seed pulse and to amplify the seed pulse to form an amplified pulse propagating in the doped optical fiber that exits a second end of the doped optical fiber as an output pulse, wherein:
   along a first length of the doped optical fiber, a pulse spectrum of the amplified pulse broadens due to a fiber nonlinearity in the doped optical fiber, and
   in an extended portion of the doped optical fiber beyond the first length, the pulse output from the first length is shifted in wavelength towards longer wavelengths and broadened in both spectral and temporal domains to form the output pulse output by the second end of the doped optical fiber.

2. The pulsed laser apparatus of claim 1, wherein the doped optical fiber is doped with an active dopant comprising ytterbium (Yb), erbium, holmium, neodymium, thulium, or any other dopant that can be described by two-level rate equations.

3. The pulsed laser apparatus of claim 2, wherein the pumping light has a wavelength of 976 nanometers (nm) or another wavelength that can be efficiently absorbed by the active dopant.

4. The pulsed laser apparatus of claim 2, wherein the seed pulse has a duration between 0.2 picoseconds (ps) and 2 ps.

5. The pulsed laser apparatus of claim 1, wherein pulse amplification causes an output pulse spectrum to broaden more than a gain spectrum of the doped optical fiber.

6. The pulsed laser apparatus of claim 5, wherein in the extended portion of the doped optical fiber, the output pulse develops a linear frequency chirp that is compensated with a grating pair.

7. A method of generating pulsed laser light comprising:
   receiving pumping light, at an input coupler, from a pumping light source and receiving a seed pulse, at the input coupler, from a seed pulse generator; and
   amplifying, along a first length of a doped optical fiber coupled to the input coupler and configured to receive the pumping light and the seed pulse, the seed pulse to generate an output pulse, wherein:
   along a first length of the doped optical fiber the pulse spectrum broadens due to nonlinearity,
   in an extended portion of the doped optical fiber beyond a first length the output pulse shifts towards longer wavelengths and broadens in both spectral and temporal domains, and
   the doped optical fiber exhibits normal dispersion and includes an output port at a second end of the doped optical fiber to export the output pulse.

8. The method of claim 7, wherein the doped optical fiber is doped with an active dopant comprising ytterbium (Yb), erbium, holmium, neodymium, thulium, or any other dopant that can be described by two-level rate equations.

9. The method of claim 8, wherein the pumping light has a wavelength of 976 nanometers (nm) or another wavelength that can be efficiently absorbed by the active dopant.

10. The method of claim 7, further comprising compressing the output pulse to yield a compressed output pulse wherein the seed pulse has a duration between 0.2 picoseconds (ps) and 2 ps, and the compressed output pulse is a sub-100-fs pulse having a duration of less than 100 fs.

11. The method of claim 7, wherein pulse amplification causes an output pulse spectrum to broaden more than a gain spectrum of the doped optical fiber.

12. The method of claim 7, wherein in the extended portion of the doped optical fiber, the output pulse develops a linear frequency chirp that is compensated with a grating pair.

13. The pulsed laser apparatus of claim 1, wherein the output pulse has a broadened spectrum peak with a bandwidth of the output pulse being 70-fold to 100-fold of a bandwidth of the seed pulse.

14. The pulsed laser apparatus of claim 1, further comprising a compressor configured to receive the output pulse and to compress the output pulse to yield a compressed output pulse that is transform-limited or at least substantially transform-limited.

15. The pulsed laser apparatus of claim 14, wherein the compressor comprises a grating pair.

16. The pulsed laser apparatus of claim 14, wherein the compressed output pulse comprises a pulse duration of less than 100-fs.

17. The pulsed laser apparatus of claim 14, wherein the compressed output pulse comprises a pulse duration between about 30-fs and about 100-fs.

18. The pulsed laser apparatus of claim 1, wherein the first length of the doped optical fiber comprises a self-phase modulation (SPM) regime, and wherein at least a portion of the extended portion of the doped optical fiber beyond the first length comprises a gain-managed nonlinearity (GMN) amplification regime.

19. The pulsed laser apparatus of claim 1, wherein a seed wavelength is selected to be close to a transition between absorption and gain in the extended portion of the doped optical fiber to facilitate balancing of nonlinear spectral broadening and gain-shaping.

20. The pulsed laser apparatus of claim 1, wherein the doped optical fiber is configured to propagate the pulse with a gain varying dynamically and spatially along a longitudinal direction of the doped optical fiber such that the pulse spectrum and a gain spectrum of the doped optical fiber co-evolve and reshape one another in tandem with amplification of the pulse and accumulation of nonlinear effects to broaden the output pulse spectrally beyond a gain bandwidth by about two orders of magnitude.

* * * * *